United States Patent
Kobayashi et al.

(10) Patent No.: US 7,572,539 B2
(45) Date of Patent: Aug. 11, 2009

(54) POLYMER ELECTROLYTE FUEL CELL

(75) Inventors: Susumu Kobayashi, Nara (JP);
Toshihiro Matsumoto, Osaka (JP);
Takeshi Tomizawa, Nara (JP);
Katsuzou Kokawa, Nara (JP); Teruhisa Kanbara, Osaka (JP)

(73) Assignee: Panasonic Corporation, Osaka (JP)

( * ) Notice: Subject to any disclaimer, the term of this patent is extended or adjusted under 35 U.S.C. 154(b) by 860 days.

(21) Appl. No.: 10/920,546

(22) Filed: Aug. 18, 2004

(65) Prior Publication Data

US 2005/0084734 A1 Apr. 21, 2005

(30) Foreign Application Priority Data

Aug. 22, 2003 (JP) ............................... 2003-298628

(51) Int. Cl.
*H01M 2/08* (2006.01)

(52) U.S. Cl. .............................. 429/35; 429/34; 429/36; 429/38; 429/39

(58) Field of Classification Search ................... 429/24, 429/35, 36, 38, 39
See application file for complete search history.

(56) References Cited

U.S. PATENT DOCUMENTS 5,464,700 A 11/1995 Steck et al.

2001/0051294 A1 12/2001 Inoue et al.
2003/0134173 A1* 7/2003 Hatoh et al. .................. 429/35

FOREIGN PATENT DOCUMENTS

| JP | 08-045517 | 2/1996 |
| JP | 2001-155745 | 6/2001 |
| JP | 2002-042838 | 2/2002 |
| JP | 2002-260693 | 9/2002 |
| JP | 2002260693 A | 9/2002 |
| WO | 94/09520 | 4/1994 |

* cited by examiner

*Primary Examiner*—Patrick Ryan
*Assistant Examiner*—Ben Lewis
(74) *Attorney, Agent, or Firm*—Panitch Schwarze Belisario & Nadel LLP

(57) ABSTRACT

A polymer electrolyte fuel cell has an MEA-gasket assembly including an MEA having a polymer electrolyte membrane, a pair of catalyst layers, and a pair of gas diffusion electrodes, and a pair of gaskets provided on peripheral portions of surfaces on both sides of the MEA with gaps between the respectively adjacent gaskets and gas diffusion electrodes. A pair of electrically conductive separators is disposed to sandwich the MEA-gasket assembly with groove-shaped cell reaction gas passages on inner surfaces of the separators, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket. Each of the gaps is at least partially closed by a closure.

3 Claims, 23 Drawing Sheets

POLYMER ELECTROLYTE FUEL CELL

BACKGROUND OF THE INVENTION

The present invention relates to the structure of a polymer electrolyte fuel cell. More particularly, the present invention relates to a stack assembly structure of a membrane electrode assembly (MEA), gaskets, and electrically conductive separators.

The conventional polymer electrolyte fuel cell has a basic power generation element as described below (see Japanese Patent No. 3045316). FIG. 21 is a plan view showing the structure of an assembly comprising a polymer electrolyte membrane electrode assembly which is the conventional basic power generation element and a gasket 106. The polymer electrolyte membrane electrode assembly is called an MEA (membrane electrode assembly). FIG. 22 is an enlarged plan view showing the structure of the portion represented by XXII in FIG. 21. FIG. 23 is a cross-sectional view taken along line XXIII-XXIII in FIG. 22.

Referring to FIG. 23, an MEA 15 comprises a polymer electrolyte membrane 12 formed by an ion-permeable membrane that selectively passes hydrogen ions, a pair of catalyst layers (cathode catalyst layer 13 and anode catalyst layer 14) disposed to interpose the membrane 12 between them and containing carbon powders carrying a platinum-group metal catalyst as a major component, and a pair of gas diffusion electrodes 107 provided on outer surfaces of the pair of catalyst layers 13 and 14, the gas diffusion electrodes having an outer periphery located inwardly relative to the outer periphery of the polymer electrolyte membrane 12. The gas diffusion electrodes 107 are formed chiefly by carbon fibers having both gas permeability and electron conductivity. In order to inhibit a fuel gas or an oxidizing gas to be supplied to the gas diffusion electrodes 107 from leaking to the outside and to inhibit these gases from being mixed, a pair of gaskets 106 are provided on peripheral portions of surfaces on both sides of the MEA 15, so as to have gaps 109 between the gaskets 106 and the gas diffusion electrodes 107. The MEA 15 and the gaskets 106 are joined to each other typically by a thermocompression bonding process. Hereinafter, the MEA 15 provided with the gaskets 106 is called an MEA-gasket assembly. Although illustrated to be enlarged in FIG. 23, a width of the gaps 109 between the gas diffusion electrodes 107 of the MEA 15 and the gaskets 106 is typically approximately 0.2 to 0.5 mm. The provision of the gaps 109 permits displacement between the gas diffusion electrodes 107 and the gaskets 106, thereby facilitating their assembly.

In addition to the above conventional structure, there has also been proposed an MEA integral with gaskets (see U.S. Pat. No. 5,464,700, and Japanese Laid-Open Patent Application Publications Nos. 2002-42838 and 2001-155745).

The basic principle of the above conventional polymer electrolyte fuel cell is such that one principal surface of the polymer electrolyte membrane 12 is exposed to the fuel gas and the other principal surface thereof is exposed to the oxidizing gas, such as air, so that chemical reaction occurs in the vicinity of the membrane 12 to generate water, and the resulting reaction energy is recovered as electricity.

However, in the conventional polymer electrolyte fuel cell, since the gaps 109 are provided between the gas diffusion electrodes 107 and the gaskets 106 as shown in FIGS. 21 and 22, part of the gases supplied to the interior of the fuel cell tend to be discharged through the gaps 109.

As shown in FIG. 21, a fuel gas supply manifold hole 3A and a fuel gas discharge manifold hole 3B are formed on opposing sides in a peripheral portion of the MEA-gasket assembly. One surface of the anode-side electrically conductive separator (see FIG. 4) provided with a fuel gas passage on a surface thereof is in contact with the principal surface (surface shown in FIG. 21) of the MEA-gasket assembly exposed to the fuel gas. As represented by broken lines in FIG. 21, the fuel gas supply manifold hole 3A and the fuel gas discharge manifold hole 3B of the MEA-gasket assembly (to be precise, fuel gas supply manifold hole and fuel gas discharge manifold hole of the electrically conductive separator) are connected to each other through the fuel gas passage of the separator. In this structure, the fuel gas passage and the gap 109 cross each other so as to fluidly communicate with each other. As indicated by the arrows in FIG. 21, a part of the gas flowing from the fuel gas supply manifold hole 3A into the fuel gas passage flows through the gap 109 and into the fuel gas discharge manifold hole 3B. The fuel gas flowing through the gap 109 is discharged without being exposed to the gas diffusion electrode 107. One surface of the cathode-side electrically conductive separator (see FIG. 3) provided with an oxidizing gas passage on a surface thereof is in contact with the principal surface of the MEA-gasket assembly exposed to the oxidizing gas. In the same manner as described above, a part of the gas flowing from the oxidizing gas supply manifold hole 5A into the oxidizing gas passage flows through the gap 109 and into the oxidizing gas discharge manifold hole 5B. The presence of cell reaction gases which are not exposed to the gas diffusion electrodes 107 reduces the utilization ratio of these gases and hence reduces power generation efficiency.

Therefore, the conventional polymer electrolyte fuel cell needs to have the utilization ratio of the cell reaction gases increased.

Meanwhile, using MEAs with integral gaskets (MEA-gasket assemblies), the fastening device for the cells must have a large size because of the need for a considerable force for fastening the cells of the fuel cell. In addition, since the gaskets are made from a material such as liquid EPDM or rubber which is highly elastic and highly durable with respect to temperature variation or reactive materials, the manufacturing cost of the fuel cell substantially increases.

BRIEF SUMMARY OF THE INVENTION

The present invention has been developed under the above circumstances, and an object of the present invention is to provide a polymer electrolyte fuel cell capable of simply increasing the utilization ratio of cell reaction gases.

According to one aspect of the present invention, there is provided a polymer electrolyte fuel cell comprising an MEA-gasket assembly including an MEA having a polymer electrolyte membrane, a pair of catalyst layers that sandwich the polymer electrolyte membrane between the catalyst layers, and a pair of gas diffusion electrodes provided on outer surfaces of the pair of catalyst layers with the outer periphery of the gas diffusion electrodes being located inwardly relative to an outer periphery of the polymer electrolyte membrane, and a pair of gaskets provided on peripheral portions of surfaces of both sides of the MEA with gaps between the respectively adjacent gaskets and gas diffusion electrodes; and a pair of electrically conductive separators disposed to sandwich the MEA-gasket assembly and provided with groove-shaped cell reaction gas passages on inner surfaces thereof, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket, wherein each of the gaps is at least partially closed by a closure.

In accordance with the above construction, since the gap between the gasket and the gas diffusion electrode is partially closed, the cell reaction gases which are not exposed to the gas diffusion electrodes decrease. Consequently, utilization ratio of the gases increases.

The closure may be configured to cause an inner periphery of the gasket to at least partially contact an outer periphery of the gas diffusion electrode.

The closure may be configured to cause the inner periphery of the gasket to at least partially contact the outer periphery of the gas diffusion electrode in such a manner that the inner periphery of the gasket is at least partially overlapped with the outer periphery of the gas diffusion electrode, and the electrically conductive separator is brought into contact with an outer surface of the MEA-gasket assembly to allow the overlapped portion of the gas diffusion electrode to be crushed.

The closure may be configured to at least partially close the gap by a plastic-deformed plastic body. The plastic body may be made of thermoplastic resin. The gap may be closed in such a manner that the plastic body is disposed in an enlarged width portion formed on the gap and is plastic-deformed to fill the enlarged width portion of the gap.

The closure may be configured to partially close the gap by an elastically deformed elastic body. The gap may be closed in such a manner that the elastic body is fitted in an elastic body receiving hole provided at a position of an inner surface of the electrically conductive separator corresponding to an enlarged width portion formed on the gap, and the inner surface of the electrically conductive separator is brought into contact with the outer surface of the MEA-gasket assembly to allow the elastic body to be fitted in the enlarged width portion of the gap.

In accordance with such a construction, since the elastic body fitted in the inner surface of the electrically conductive separator serves to position the MEA-gasket assembly and the electrically conductive separator, assembly of the MEA-gasket assembly and the electrically conductive separator is facilitated and done well.

According to another aspect of the present invention, there is provided a polymer electrolyte fuel cell comprising an MEA-gasket assembly including an MEA having a polymer electrolyte membrane, a pair of catalyst layers that sandwich the polymer electrolyte membrane between the catalyst layers, and a pair of gas diffusion electrodes provided on outer surfaces of the pair of catalyst layers, an outer periphery of the gas diffusion electrodes being located inwardly relative to an outer periphery of the polymer electrolyte membrane, and a pair of gaskets disposed on peripheral portions of surfaces of both sides of the MEA with gaps between the respectively adjacent gaskets and gas diffusion electrodes; and a pair of electrically conductive separators disposed to sandwich the MEA-gasket assembly and provided with groove-shaped cell reaction gas passages on inner surfaces thereof, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket, wherein each of the gaps is bent in a wave shape.

The gap may be bent in a rectangular wave shape, a triangular wave shape, or shapes having other than straight line wave segments.

In accordance such a construction, since water remains in and closes the gap between the gasket and the gas diffusion electrode, the cell reaction gases which are not exposed to the gas diffusion electrode decrease, and consequently, the utilization ratio of the gases increases. In addition, since a large amount of water remains in the gap and thereby the polymer electrolyte membrane contains water in re-start of the polymer electrolyte fuel cell, the time required from start to a rated operation in re-start of the fuel cell becomes shorter than the time required in a first start.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

EMBODIMENT 1

Figure 1:
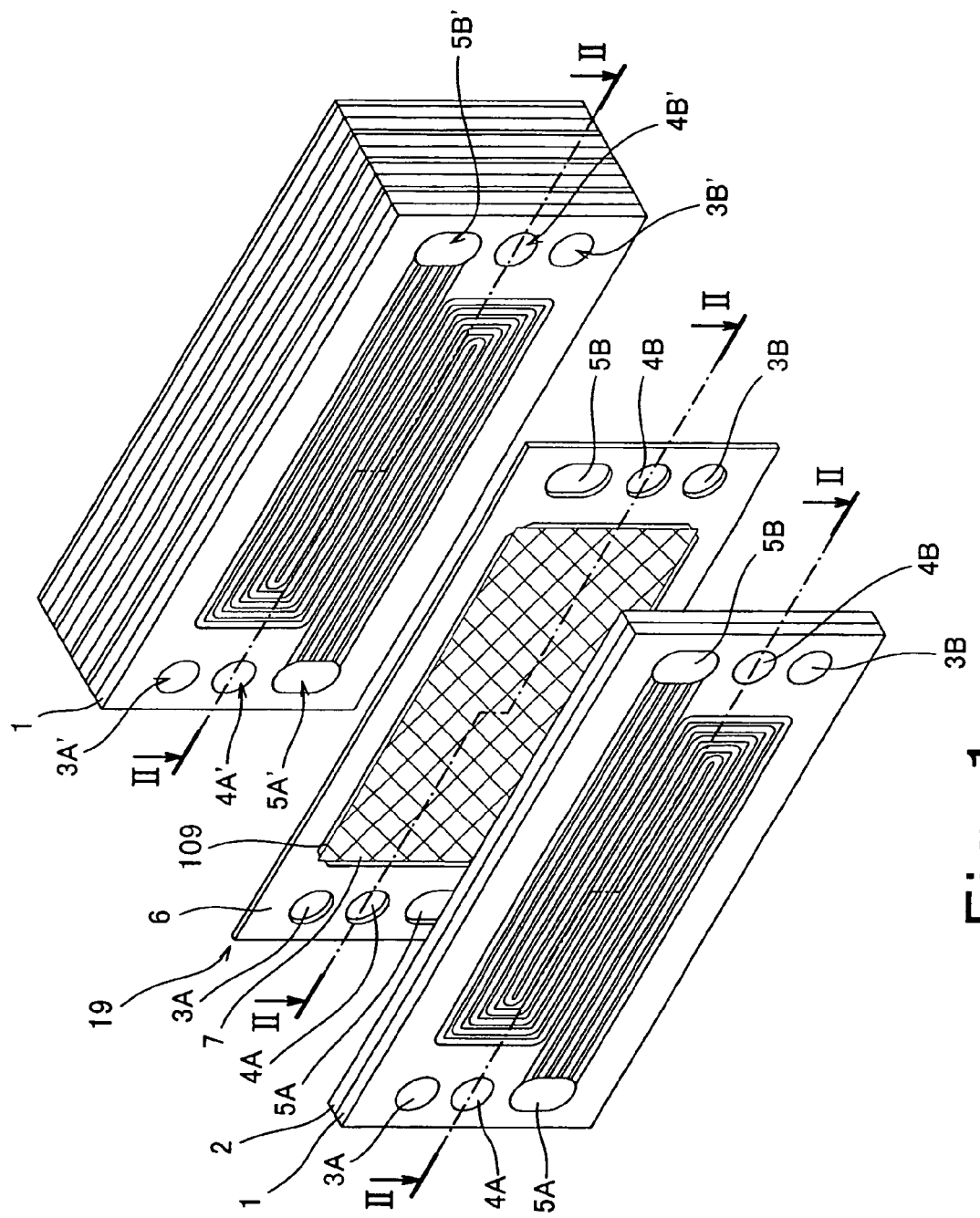
FIG. 1 is a perspective view showing the structure of a polymer electrolyte fuel cell according to a first embodiment of the present invention.
Figure 2:
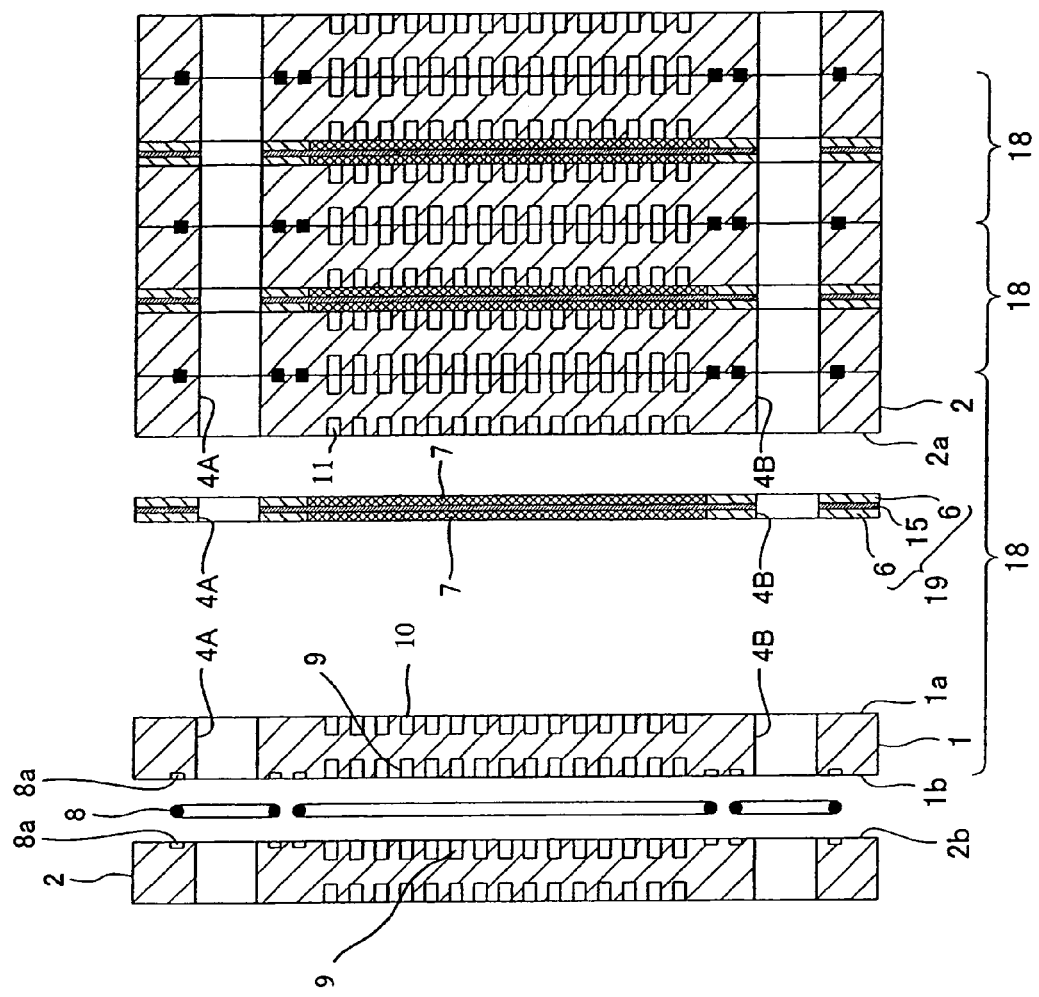
FIG. 2 is a cross-sectional view taken along line II-II in FIG. 1.

FIG. 1 is a exploded perspective view showing the structure of a polymer electrolyte fuel cell according to a first embodiment of the present invention. In FIG. 1, a stack structure of the polymer electrolyte fuel cell is partially exploded for the sake of convenience. FIG. 2 is a cross-sectional view taken along line II-II in FIG. 1. As in the structure of FIG. 1, a stack structure of the polymer electrolyte fuel cell is exploded for the sake of convenience.

Referring now to FIGS. 1 and 2, the polymer electrolyte fuel cell is formed by stacked cells 18 (unit cells: see FIG. 2).

As shown in FIG. 2, the cell 18 is structured such that an MEA (membrane electrode assembly)-gasket assembly 19 is sandwiched between a cathode-side electrically conductive separator (hereinafter referred to as a cathode separator) 1 and an anode-side electrically conductive separator (hereinafter referred to as an anode separator) 2.

As shown in FIG. 1, a pair of a fuel gas supply manifold hole 3A through which a fuel gas is supplied and a fuel gas discharge manifold 3B through which the fuel gas is discharged, a pair of an oxidizing gas supply manifold hole 5A through which an oxidizing gas is supplied and an oxidizing gas discharge manifold 5B through which the oxidizing gas is discharged, and a pair of water supply manifold hole 4A and a water discharge manifold hole 4B are respectively formed in opposing peripheral portions of the MEA-gasket assembly 19, the cathode separator 1 and the anode separator 2.

As shown in FIG. 2, the above-constructed cells 18 are stacked with O-rings 8 (water cooling surface seal members) sandwiched between them. The stacked cells 18 are sandwiched in a conventional manner between end plates (not shown) on both ends with current collecting plates (not shown) and insulating plates (not shown) interposed between the stacked cells 18 and the end plates, and fastened by fastening bolts (not shown) from both ends. The thus-formed stacked cell structure is called a stack, which forms a main portion of the polymer electrolyte fuel cell. As shown in FIG. 1, this stack is provided with a fuel gas supply manifold 3A' and a fuel gas discharge manifold 3B' respectively formed by the fuel gas supply manifold holes 3A and the fuel gas discharge manifold holes 3B, an oxidizing gas supply manifold 5A' and an oxidizing gas discharge manifold 5B' respectively formed by the oxidizing gas supply manifold holes 5A and the oxidizing gas discharge manifold holes 5B, and a water supply manifold 4A' and a water discharge manifold 4B' respectively formed by the water supply manifold holes 4A and the water discharge manifold holes 4B in opposing peripheral portions. These manifolds 3A' and 3B', 5A' and 5B', and 4A' and 4B' penetrate the stack in the direction in which the cells 18 are stacked.

Figure 3:
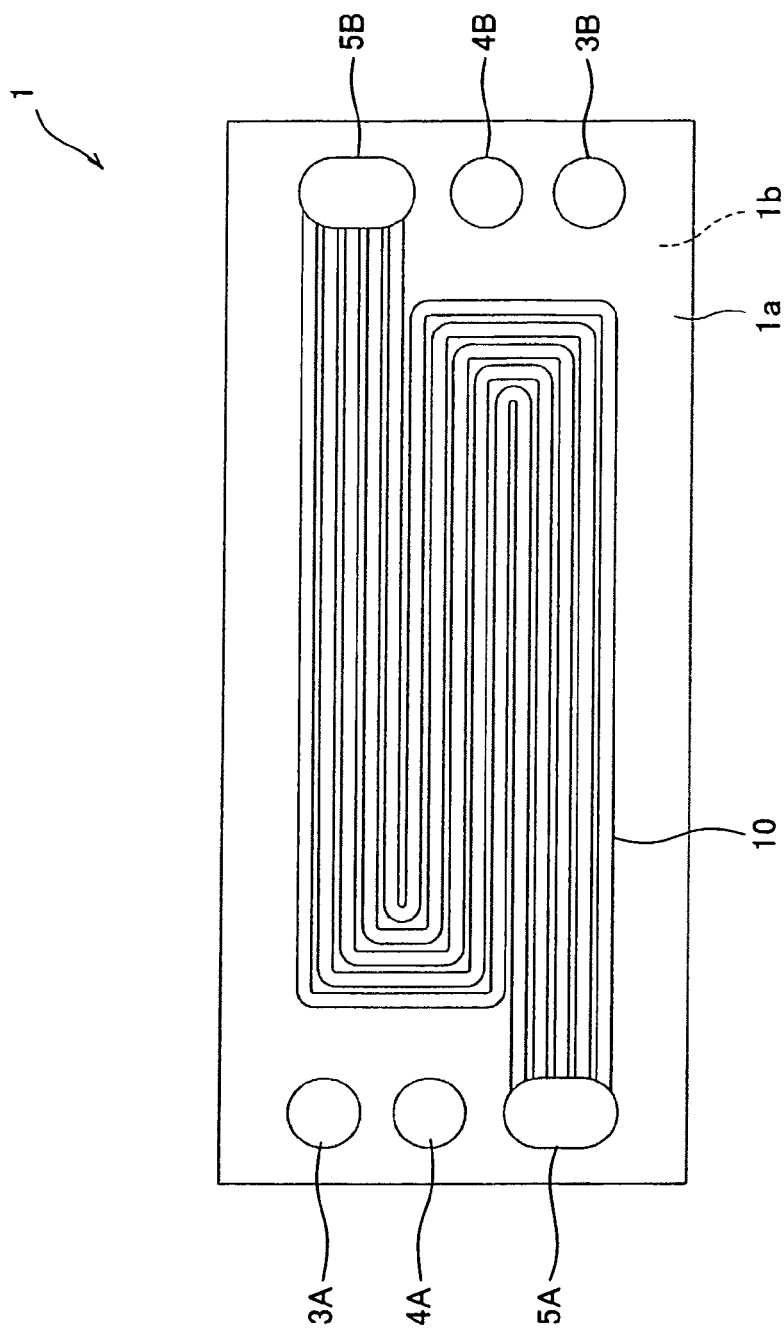
FIG. 3 is a plan view showing an oxidizing gas passage pattern of a cathode separator according to a first embodiment of the present invention.
Figure 4:
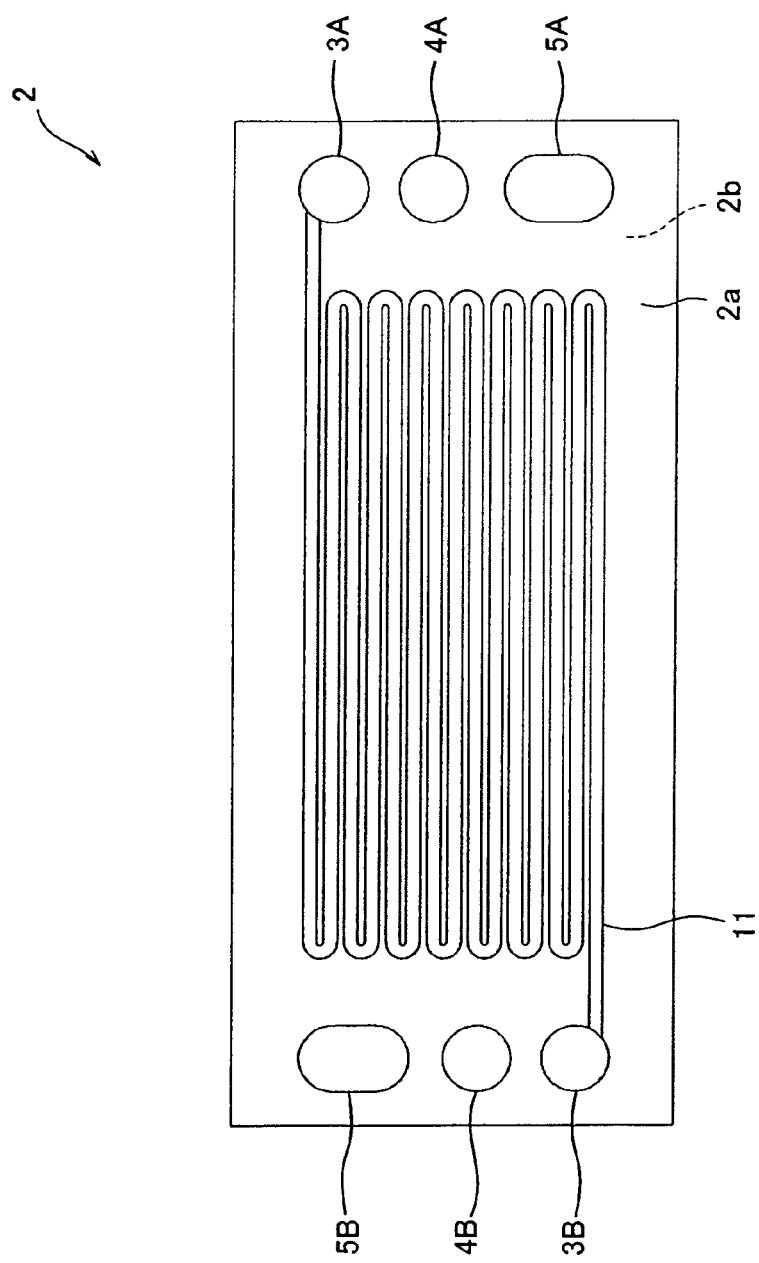
FIG. 4 is a plan view showing a fuel gas passage pattern of an anode separator according to the first embodiment.

FIG. 3 is a plan view showing the pattern of the oxidizing gas passage of the cathode separator 1, and FIG. 4 is a plan view showing the pattern of the fuel gas passage of the anode separator 2.

Referring to FIGS. 1 through 3, an oxidizing gas passage 10 is formed on one principal surface (inner surface) 1a of the cathode separator 1 which contacts the MEA 15. The oxidizing gas passage 10 is formed by grooves and configured to connect the oxidizing gas supply manifold hole 5A and the oxidizing gas discharge manifold hole 5B to each other. In addition, a cooling water passage 9 (see FIG. 2) is formed on the other principal surface (outer surface) 1b of the cathode separator 1. The cooling water passage 9 is formed by grooves and configured to connect the water supply manifold hole 4A and the water discharge manifold hole 4B. O-ring receiving grooves 8a are formed at appropriate positions of the outer surfaces 1b to receive the O-rings 8 (see FIG. 2).

Referring to FIGS. 1, 2, and 4, a fuel gas passage 11 is formed on a principal surface (inner surface) 2a of the anode separator 2 which contacts the MEA 15. The fuel gas passage 11 is formed by grooves and configured to connect the fuel gas supply manifold hole 3A and the fuel gas discharge manifold hole 3B. In addition, a cooling water passage 9 (see FIG. 2) is formed on the other principal surface (outer surface) 2b of the anode separator 2. The cooling water passage 9 is formed by grooves and configured to connect the water supply manifold hole 4A and the water discharge manifold hole 4B. O-ring receiving grooves 8a are formed at appropriate positions of the outer surface 2b to receive the O-rings 8 (see FIG. 2).

Figure 5:
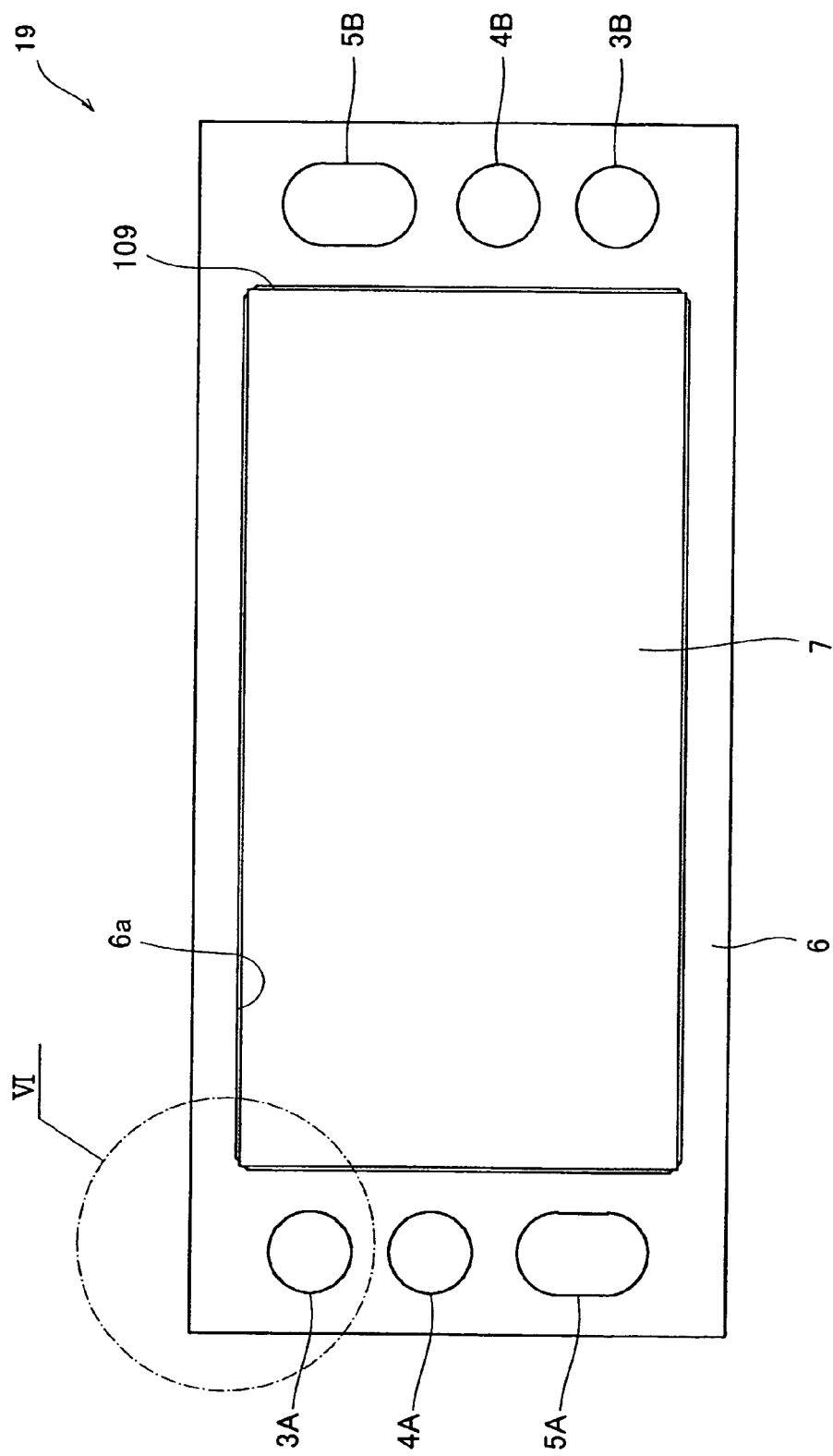
FIG. 5 is a plan view showing the structure of an MEA-gasket assembly equipped in a polymer electrolyte fuel cell according to the first embodiment.
Figure 6:
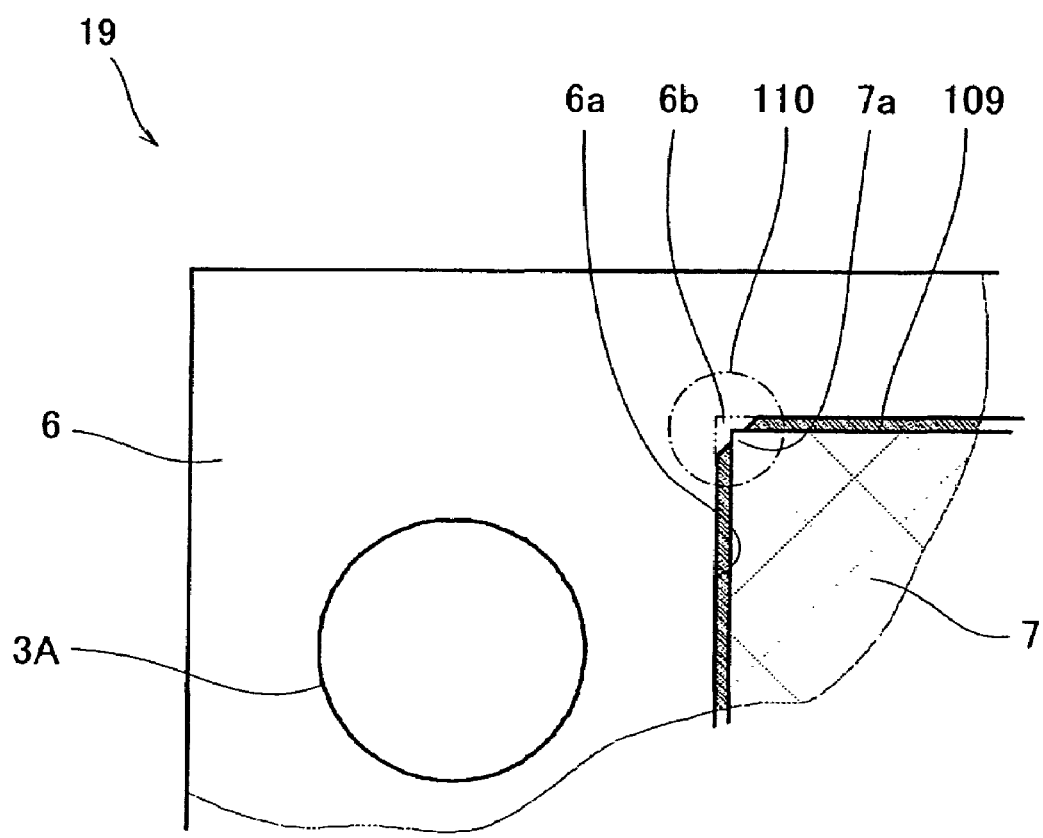
FIG. 6 is an enlarged plan view showing the structure of the portion represented by VI in FIG. 5.

FIG. 5 is a plan view showing the structure of the MEA-gasket assembly 19, and FIG. 6 is an enlarged plan view showing the portion represented by VI in FIG. 5.

Referring to FIGS. 2 and 5, the MEA-gasket assembly 19 is basically identical to the MEA-gasket assembly already described in the Background of the Invention, except for the structure of the gap 109 between the gasket 6 and the gas diffusion electrode 7. Therefore, the MEA-gasket assembly 19 will not be further described in detail.

Figure 23:
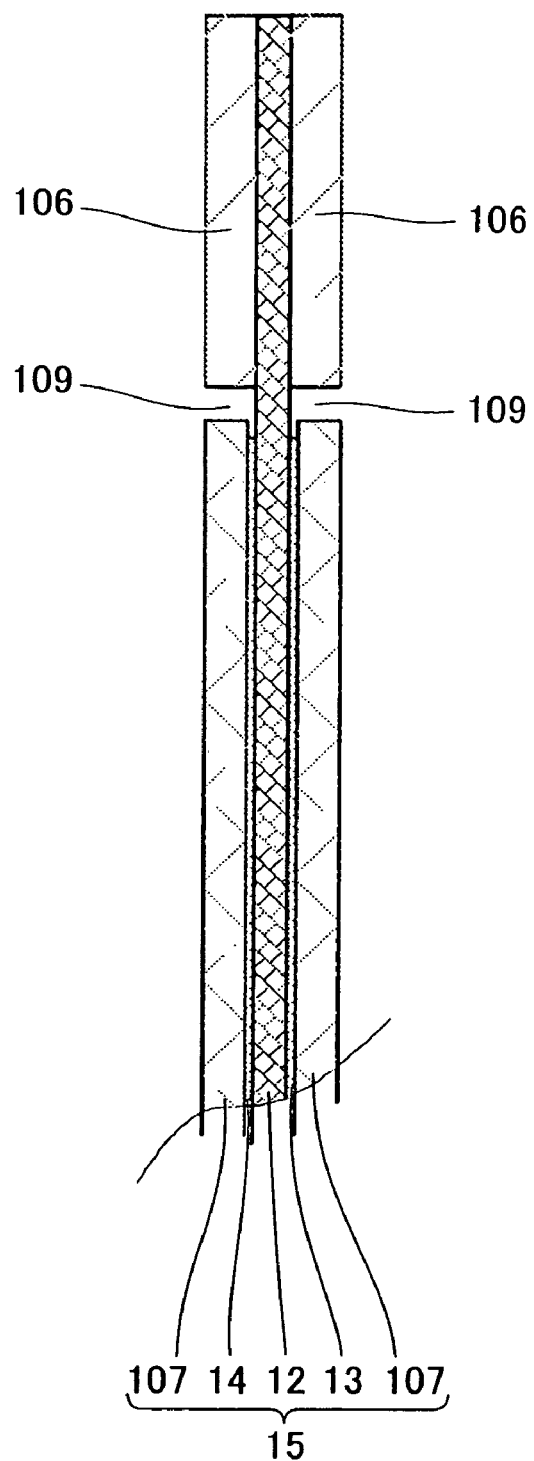
FIG. 23 is a cross-sectional view taken along line XXIII-XXIII in FIG. 22.

As shown in FIG. 5, an annular (rectangular and annular) gasket 6 is provided on a peripheral portion of the polymer electrolyte membrane 12 (see FIG. 23) provided with the catalyst layer 14 (see FIG. 23), i.e., MEA 15 in FIG. 2. The gas diffusion electrode layer 7 is provided on an outer surface of the catalyst layer 14 exposed to a hollow portion of the annular gasket 6 and is located inwardly relative to the outer periphery of the polymer electrolyte membrane 12. Likewise, the catalyst layer 13 is formed with the gasket 6 and the gas diffusion electrode 7 provided on an opposite surface of the polymer electrolyte membrane 12, i.e., the principal surface of the polymer electrolyte membrane 12 on the oxidizing gas side, although not shown. These are joined by a thermo-compression bonding process, thereby forming the MEA-gasket assembly 19 (see FIGS. 2 and 23). The annular gap 109 is formed between the gasket 6 and the gas diffusion electrode 7.

As shown in FIG. 6, a portion 110 (hereinafter referred to as a gap closing portion) is formed to close the gap 109 between the gas diffusion electrode 7 and the gasket 6. The gap closing portion 110 is a feature of the present invention. Specifically, the gap closing portion 110 is formed in such a manner that a part of an inner periphery 6a of the gasket 6 and a part of an outer periphery of the gas diffusion electrode 7 come in contact with each other, when the pair of gas diffusion electrodes 7 are provided on the outer surfaces of the pair of catalyst layers 13 and 14 exposed to the hollow portions of the gaskets 6. In the first embodiment, the gasket 6 is rectangular, and the inner periphery 6a of the gasket 6 is also rectangular. Four corners of the inner periphery 6a are formed into triangular portions 6b. Four corner portions 7a of the rectangular gas diffusion electrode 7 are overlapped with the triangular portions 6b. In the same manner, corner portions 7a of the gas diffusion electrode 7 are overlapped with triangular portions 6b of the gasket 6 on the opposite surface of the polymer electrolyte membrane 12, i.e., on the principal surface of the membrane 12 on the oxidizing gas side (not shown). A thermo-compression bonding process was carried out to form the MEA-gasket assembly 19.

As shown in FIG. 1, the cathode separator 1 and the anode separator 2 are brought into contact with the outer surfaces of the MEA-gasket assembly 19. By doing so, portions of the corner portions 7a of the gas diffusion electrode 7 which are located on the triangular portions 6b of the gasket 6 are crushed, thereby causing the inner periphery 6a of the gasket 6 and the outer periphery of the gas diffusion electrode 7 to partially contact each other. Since the gas diffusion electrode 7 is chiefly formed by fragile carbon fibers and has a void percentage of 80 to 90%, the portions of the corner portions 7a of the gas diffusion electrode 7 which are located on the triangular portions 6b are easily crushed by a local load due to the cell fastening force. Although only one surface of the MEA-gasket assembly 19 is shown in FIG. 5, the gap closing portion 110 is formed on the opposite surface in the same manner.

In the following, the operation of the above constructed polymer electrolyte fuel cell will be described.

Referring to FIGS. 1 through 6, in the polymer electrolyte fuel cell, a fuel gas (e.g., hydrogen) is supplied through the fuel gas supply manifold 3A'. The fuel gas branches and flows into the fuel gas passage 11 of the anode separator 2. While flowing through the fuel gas passage 11, the fuel gas contacts the MEA 15, permeates the gas diffusion electrode 7, and contacts the polymer electrolyte membrane 12 through the anode catalyst layer 14. Thereby, the fuel gas and the oxidizing gas react with each other and are consumed through a cell reaction. The extra fuel gas reaches the fuel gas discharge manifold 3B' and is discharged therefrom. In the meantime, in the polymer electrolyte fuel cell, the oxidizing gas (e.g., air) is supplied through the oxidizing gas supply manifold 5A'. The oxidizing gas branches and flows into the oxidizing gas passage 10 of the cathode separator 1. While flowing through the oxidizing gas passage 10, the oxidizing gas contacts the MEA 15, permeates the gas diffusion electrode 7, and contacts the polymer electrolyte membrane 12 through the cathode catalyst layer 13. Thereby, the fuel gas and the oxidizing gas react with each other and are consumed through the cell reaction. The extra oxidizing gas reaches the oxidizing gas discharge manifold 5B' and is discharged therefrom. During this time, cooling water supplied from the water supply manifold 4A' flows through the cooling water passage 9 and is discharged through the water discharge manifold 4B'. Consequently, the stack is cooled.

Since the MEA-gasket assembly 19 is provided with the gap closing portion 110, it is possible to inhibit the fuel gas from flowing from the fuel gas supply manifold 3A' to the fuel gas discharge manifold 3B' through the gap 109 between the gas diffusion electrode 7 and the gasket 6, and to inhibit the oxidizing gas from flowing from the oxidizing gas supply manifold 5A' to the oxidizing gas discharge manifold 5B' through the gap 109.

EXAMPLE 1

In this example according to Embodiment 1 the MEA-gasket assembly 19 in FIGS. 5 and 6 was manufactured by the following process.

First, platinum was carried in a weight ration of 1:1 on KETJEN® BLACK EC (furnace black produced by Ketjen Black International Co., Ltd) with a specific surface area of 800 m$^2$/g and a DBP oil absorbing amount of 360 ml/100 g. Then, 35 g of water and 59 g of a liquid alcohol dispersion of hydrogen ion conductive polymer electrolyte (9% FSS produced by Asahi Garasu Co. Ltd) were mixed with 10 g of catalyst powder, and were dispersed by ultrasonic agitator, thereby producing a catalyst layer ink. The catalyst layer ink was applied to polypropylene film (TREFAN® 50-2500 produced by Toray Co. Ltd) and dried, thereby forming the catalyst layers 13 and 14. The catalyst layers 13 and 14 were cut into pieces of 104×216 mm, which were transferred to center portions of surfaces on both sides of the polymer electrolyte membrane 12 of 330×150 mm (50 μm thick Nafion® 117 produced by E.I. Dupont Co. Ltd) at a temperature of 135° C. and a pressure of 32 kgf/cm$^2$.

Subsequently, EPDM was coated to a thickness of 100 μm on surfaces of both sides of a 50 μm thick PET sheet and subjected to electron beam cross-linking, thereby forming a 250 μm thick sheet gasket. Thereafter, the sheet gasket was molded by a Thomson cutting mold to form the gasket 6 having the shape shown in FIG. 5. More specifically, the gasket 6 is sized to be 130×300 mm, and has a hollow portion of 108×220 mm provided with the triangular portions 6b (shown in FIG. 6) at the four corners of the inner periphery 6a, and the above-described pairs of fuel gas, oxidizing gas, and water manifolds.

As the gas diffusion electrode 7, carbon fiber cloth having a size of 107×219 mm and thickness of 0.3 mm (CARBEL® CL 300 manufactured by Japan Goretex Co. Ltd) was used.

The gaskets 6 were disposed so that the catalyst layers 13 and 14 (not shown) at the center portions of the polymer electrolyte membrane 12 were positioned at the center portions of the gaskets 6. The gas diffusion electrodes 7 were provided on the outer surfaces of the catalyst layers 13 and 14, so as to have their outer peripheries located inwardly relative to the outer periphery of the polymer electrolyte membrane 12. The four corner portions 7a of the gas diffusion electrodes 7 were caused to be positioned partially over the triangular portions 6b provided at the four corner portions of the inner periphery 6a of the gasket 6. Under these conditions, a thermo-compression bonding process was carried out at 130° C. and at 2 MPa for one minute, thereby forming the MEA-gasket assembly 19. In this manner, the MEA-gasket assembly 19 was obtained with the gap 109 between the gasket 6 and the gas diffusion electrode 7 closed by the gap closing portions 110. The corner portions 7a of the gas diffusion electrode 7 were formed into a thickness of approximately 45 μm by the thermo-compression bonding process. Further, since in fastening the cells 18 together into a stack, the cathode separator 1 and the anode separator 2 were brought into contact with the outer surfaces of the MEA-gasket assembly 19 and the corner portions 7a were thereby crushed, the corner portions 7a did not impede gas sealing ability of the gaskets 6.

The MEA-gasket assembly 19 was sandwiched between the cathode separator 1 and the anode separator 2 shaped as shown in FIGS. 3 and 4(separators manufactured by machining from 3 mm-thick glassy carbon produced by Tokai Carbon Co. Ltd, water passages on the back surfaces thereof are omitted in the drawing), and fastened by using a fastening gig with a fastening force of 2.5 ton. Thus, the four-cell stack in FIGS. 1 and 2 was assembled.

In order to confirm performance of the four-cell stack manufactured as described above, the following characteristic test was carried out. In addition, for comparison, an MEA 15 comprising the gaskets 6 equal in size to that of Example 1 and without triangular portions and the gas diffusion electrode 7 equal in size to that of Example 1 was manufactured in a process like Example 1. This MEA 15 (hereinafter "conventional example") was assembled into a four-cell stack, and the same characteristic test was carried out.

Figure 7:
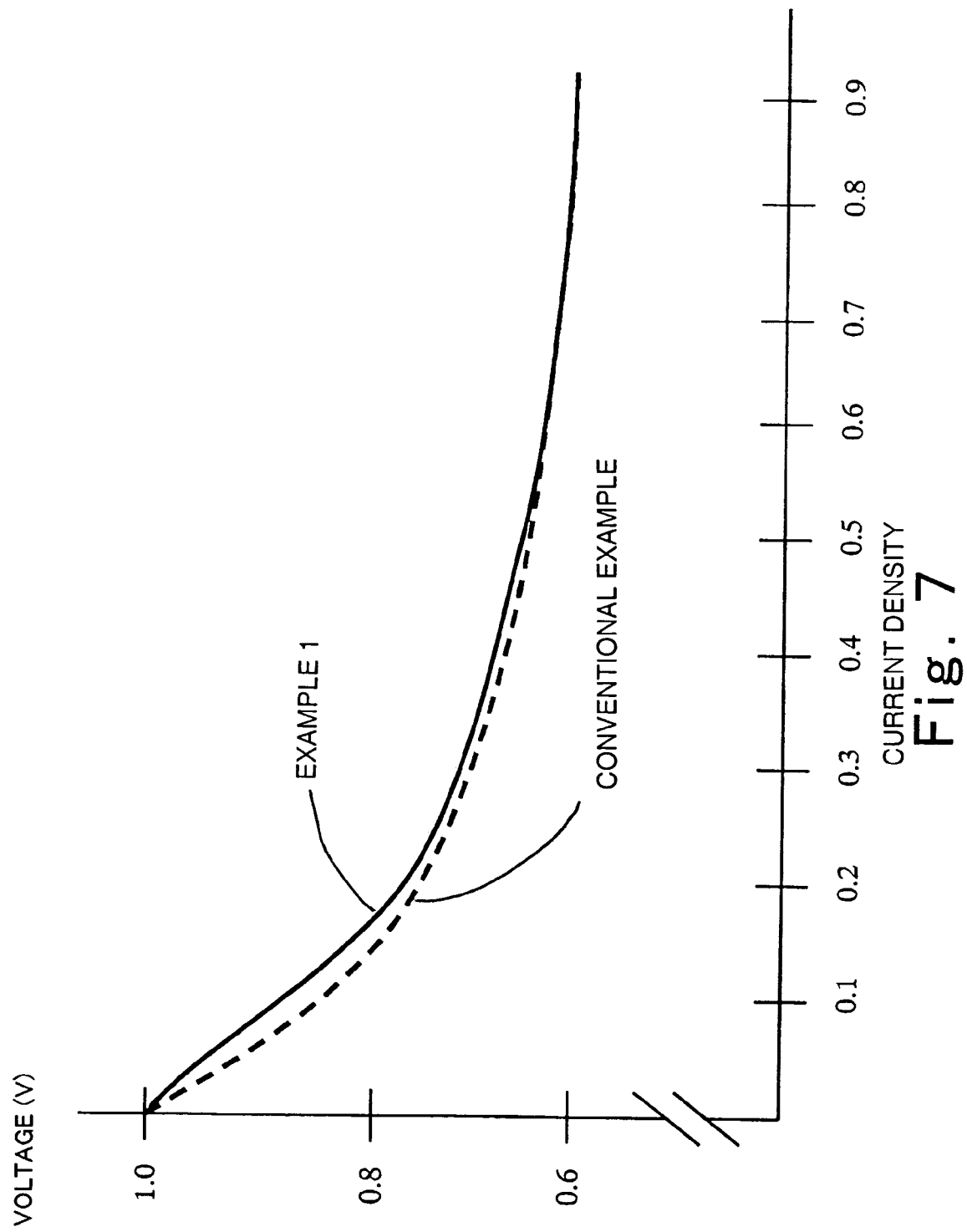
FIG. 7 is a graph showing a comparison of current-voltage characteristics between the polymer electrolyte fuel cell according to Example 1 and a conventional polymer electrolyte fuel cell.

The above four-cell stacks were operated under conditions in which the cell temperature was 70° C., the fuel gas was pure hydrogen (hydrogen humidified to have a dew-point temperature of 70° C., fuel utilization ratio: 80%), and the oxidizing gas was air (air humidified to have a dew point temperature of 70° C., air utilization ratio: 40%), and the current-voltage characteristic was measured. The results are shown in FIG. 7. As shown in FIG. 7, comparing the result of Example 1 represented by a solid line and the result of the conventional example represented by a broken line, it can be seen that the output was increased on the low current density end where less gas was supplied, and hence power generation efficiency of the polymer electrolyte fuel cell was increased in Example 1 in contrast to the conventional example.

Figure 8:
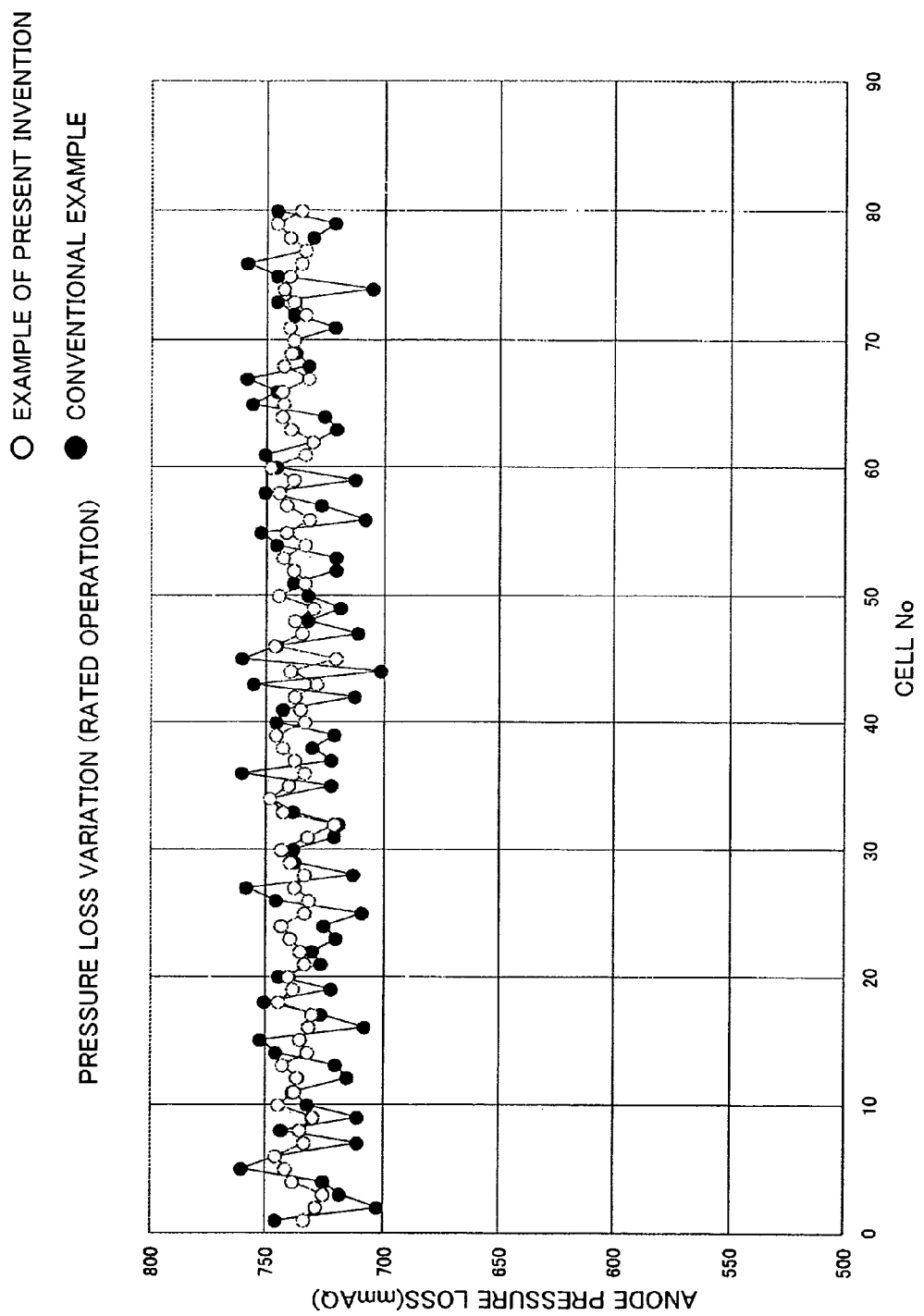
FIG. 8 is a graph showing a comparison of pressure loss variation between a fuel gas supply manifold and a fuel gas discharge manifold among cells of the polymer electrolyte fuel cell according to Example 1 and cells of a conventional polymer electrolyte fuel cell.

FIG. 8 shows the state of pressure loss (drop) between the fuel gas supply manifold 3A' and the fuel gas discharge manifold 3B' in respective cells in an 80-cell stack. In contrast to the conventional example, the variation among the cells in the pressure loss between the fuel gas supply manifold 3A' and the fuel gas discharge manifold 3B' decreases in Example 1, as shown in FIG. 8. The reason is as follows. Since positioning the gas diffusion electrode 7 and the hollow portion of the gasket 6 is difficult in the cell assembly process of the conventional example, the width of the gap 109 becomes non-uniform on the outer periphery of the gas diffusion electrode 7. Consequently, the amount of the fuel gas flowing from the fuel gas supply manifold hole 3A to the fuel gas discharge manifold hole 3B through the gap 109 varies from cell to cell, and hence the pressure loss between the fuel gas supply manifold 3A' and the fuel gas discharge manifold 3B' varies from cell to cell. On the other hand, it is presumed that since the fuel gas flowing through the gap 109 was blocked in this Example 1 of the first embodiment, the pressure loss between the fuel gas supply manifold 3A' and the fuel gas discharge manifold 3B' varies less from cell to cell. Thereby, in a cell with high pressure loss between the fuel gas supply manifold 3A' and the fuel gas discharge manifold 3B', the problem of flooding, caused by difficulty of discharging water during operation in a region where the gas is supplied less and the current density is low, has been solved. This is desirable for stable operation of the polymer electrolyte fuel cell. Likewise, it is presumed that since the oxidizing gas flowing through the gap 109 was blocked in this Example 1, the pressure loss between the oxidizing gas supply manifold 5A' and the oxidizing gas discharge manifold 5B' varies less from cell to cell.

EMBODIMENT 2

Figure 9:
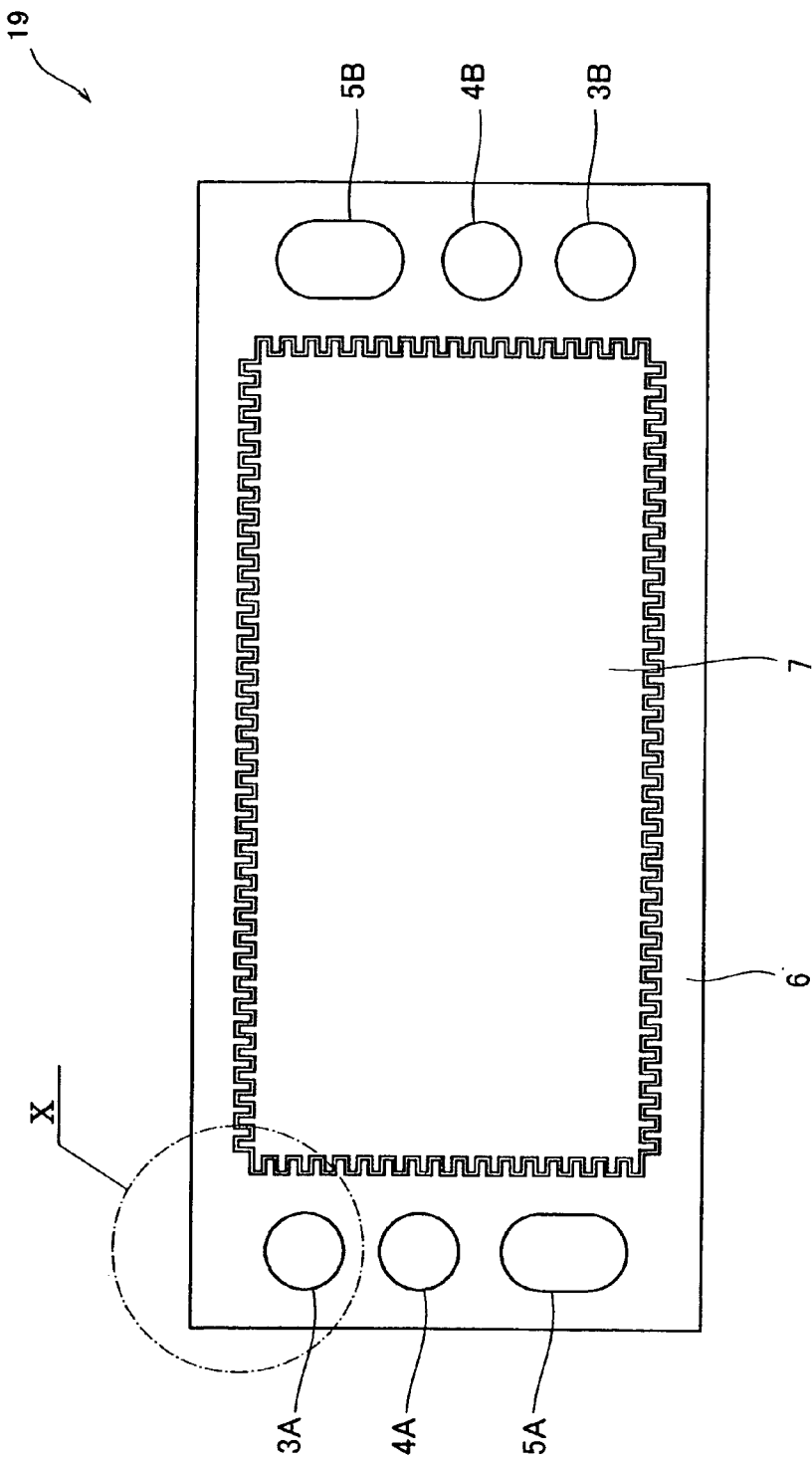
FIG. 9 is a plan view showing the structure of an MEA-gasket assembly equipped in a polymer electrolyte fuel cell according to a second embodiment of the present invention.
Figure 10A:
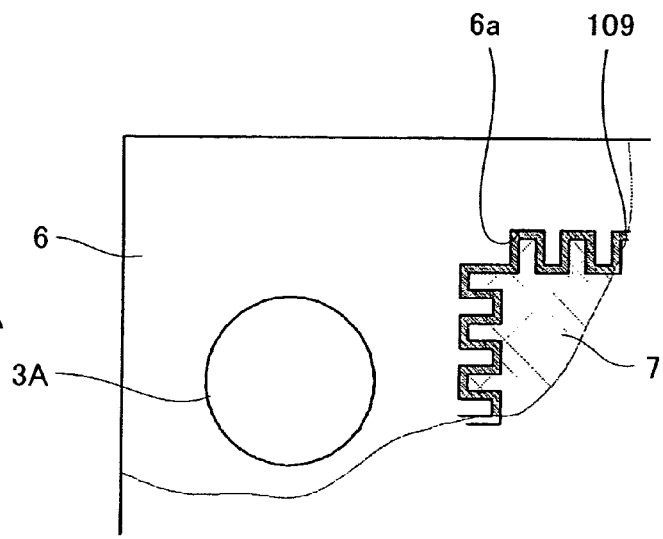
FIG. 10A is an enlarged plan view showing one structure of the portion represented by X in FIG. 9.

FIG. 9 is a plan view showing the structure of an MEA-gasket assembly 19 of a polymer electrolyte fuel cell according to a second embodiment of the present invention. FIG. 10A is an enlarged plan view showing the structure of the portion represented by X in FIG. 9. In FIGS. 9 and 10A, the same reference numerals as those in FIGS. 5 and 6 denote the same or corresponding parts.

Referring to FIGS. 9 and 10A, the MEA-gasket assembly 19 of the second embodiment is substantially identical to that of the MEA-gasket assembly 19 of the first embodiment except for the structure of the gap 109 between the gasket 6 and the gas diffusion electrode 7.

As shown in FIGS. 9 and 10A, in the MEA-gasket assembly 19, the gap 109 between the gasket 6 and the gas diffusion electrode 7 is formed in the shape of rectangular wave (6 mm pitch×50 turn). More specifically, the outer periphery of the gas diffusion electrode 7 is formed in convex and concave shapes composed of a continuous series of rectangles (6 mm pitch×50 turn). The gasket 6 has the inner periphery 6a formed in convex and concave shape composed of a continuous series of rectangles and is disposed on the outer periphery of the gas diffusion electrode 7, such that the inner periphery 6a engages with the outer periphery of the electrode 7 with a predetermined gap. By way of example, in the second embodiment, the inner periphery 6a of the gasket 6 is sized larger by approximately 1 mm than the outer periphery of the gas diffusion electrode 7 in the longitudinal and lateral directions. In other words, the gap 109 between the gasket 6 and the gas diffusion electrode 7 is approximately 0.5 mm on average.

In the following, the operation of the polymer electrolyte fuel cell constructed as described above will be described. In the polymer electrolyte fuel cell, since the polymer electrolyte membrane is required to contain sufficient water in order to achieve desired cell performance in its operation principle, the fuel gas and the oxidizing gas contain water. For this reason, in an early stage of startup of the fuel cell, part of the fuel gas flows through the gap 109 between the gasket 6 and the gas diffusion electrode 7. However, since the gap 109 is formed in the shape of a rectangular wave, water contained in the fuel gas remains in any bent portion of the gap 109 and thereby closes the gap 109 after an elapse of time, thereby causing the flow of the fuel gas to be blocked. This makes it possible to inhibit the fuel gas from flowing from the fuel gas supply manifold 3A' to the fuel gas discharge manifold 3B' through the gap 109 between the gas diffusion electrode 7 and the gasket 6. Likewise, on the principal surface of the MEA-gasket assembly 19 on the oxidizing gas side, the water contained in the oxidizing gas or water generated in the MEA 15 remains in any bent portion of the gap 109 between the gasket 6 and the gas diffusion electrode 7 after an elapse of time, thereby causing the flow of the oxidizing gas to be blocked. This makes it possible to inhibit the oxidizing gas from flowing from the oxidizing gas supply manifold 5A' to the oxidizing gas discharge manifold 5B' through the gap 109 between the gas diffusion electrode 7 and the gasket 6.

EXAMPLE 2

In this Example 2 according to Embodiment 2, the MEA-gasket assembly 19 shown in FIGS. 9 and 10A was manufactured as in Example 1 of the first embodiment except for the shape of the gap 109.

In order to confirm the performance of the MEA gasket 19 of Example 2, the following characteristic test was carried out. In addition, the conventional example used for comparison with Example 1 was re-manufactured and assembled into a four-cell stack, and the same characteristic test was carried out.

Figure 11:
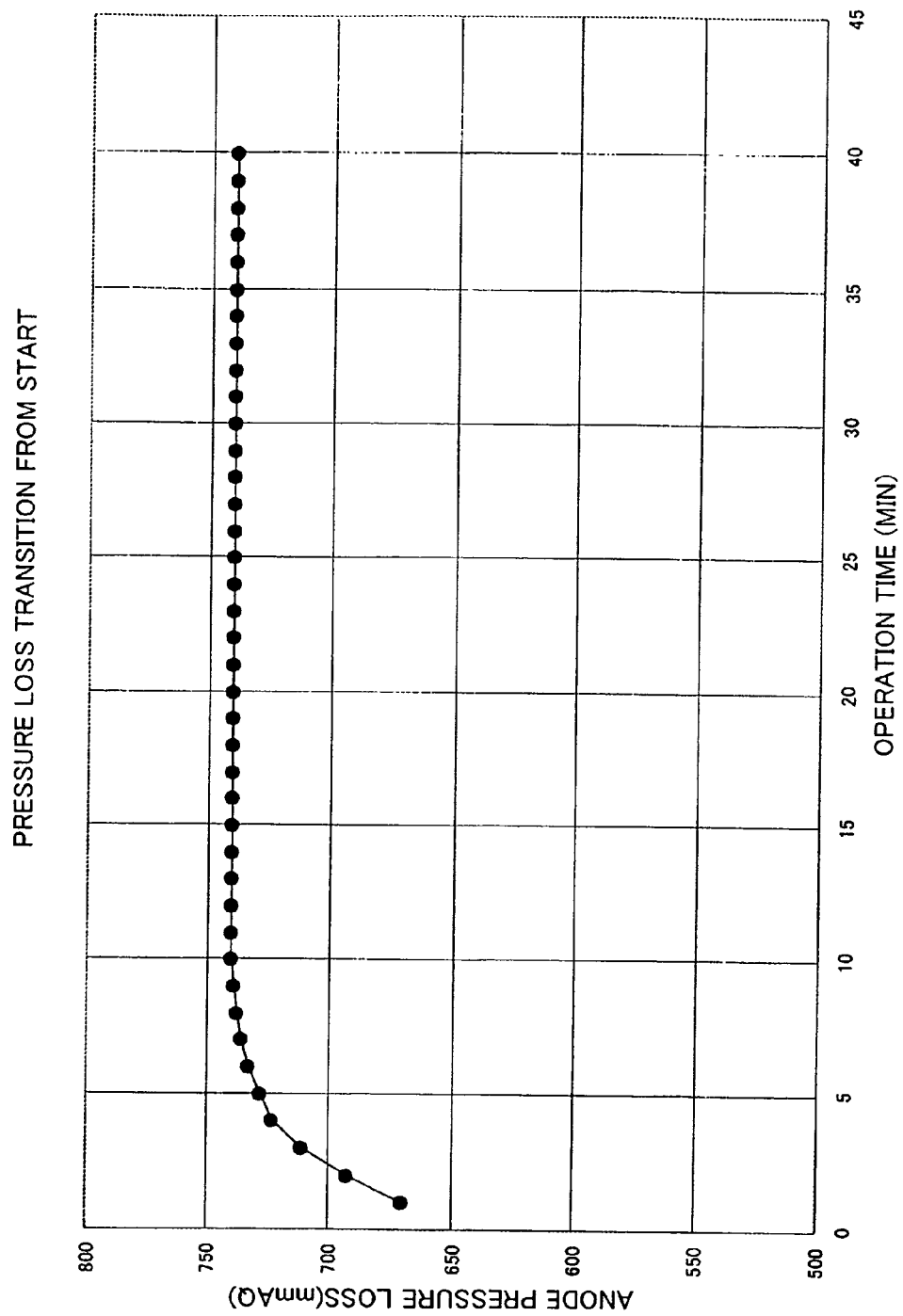
FIG. 11 is a graph showing a start characteristic of pressure loss from a fuel gas supply manifold to a fuel gas discharge manifold of the polymer electrolyte fuel cell according to Example 2 of the present invention.

The above four-cell stack comprising the MEA-gasket assembly 19 of Example 2 was operated under conditions in which the cell temperature was 70° C., the fuel gas was pure hydrogen (hydrogen humidified to have a dew-point temperature of 70° C., fuel utilization ratio: 80%), and the oxidizing gas was air (air humidified to have a dew point temperature of 70° C., air utilization ratio: 40%), and transition of the pressure loss between the fuel gas supply manifold 3A' and the fuel gas discharge manifold 3B' from the start of the operation was measured. The results are shown in FIG. 11. As shown in FIG. 11, the pressure loss between the fuel gas supply manifold 3A' and the fuel gas discharge manifold 3B' gradually increases within 10 minutes from the start, and then reaches a steady state. It is presumed that the behavior of the pressure loss is due to the fact that the water contained in the fuel gas closes the gap 109 between the gasket 6 and the gas diffusion electrode 7 after an elapse of time.

Figure 12:
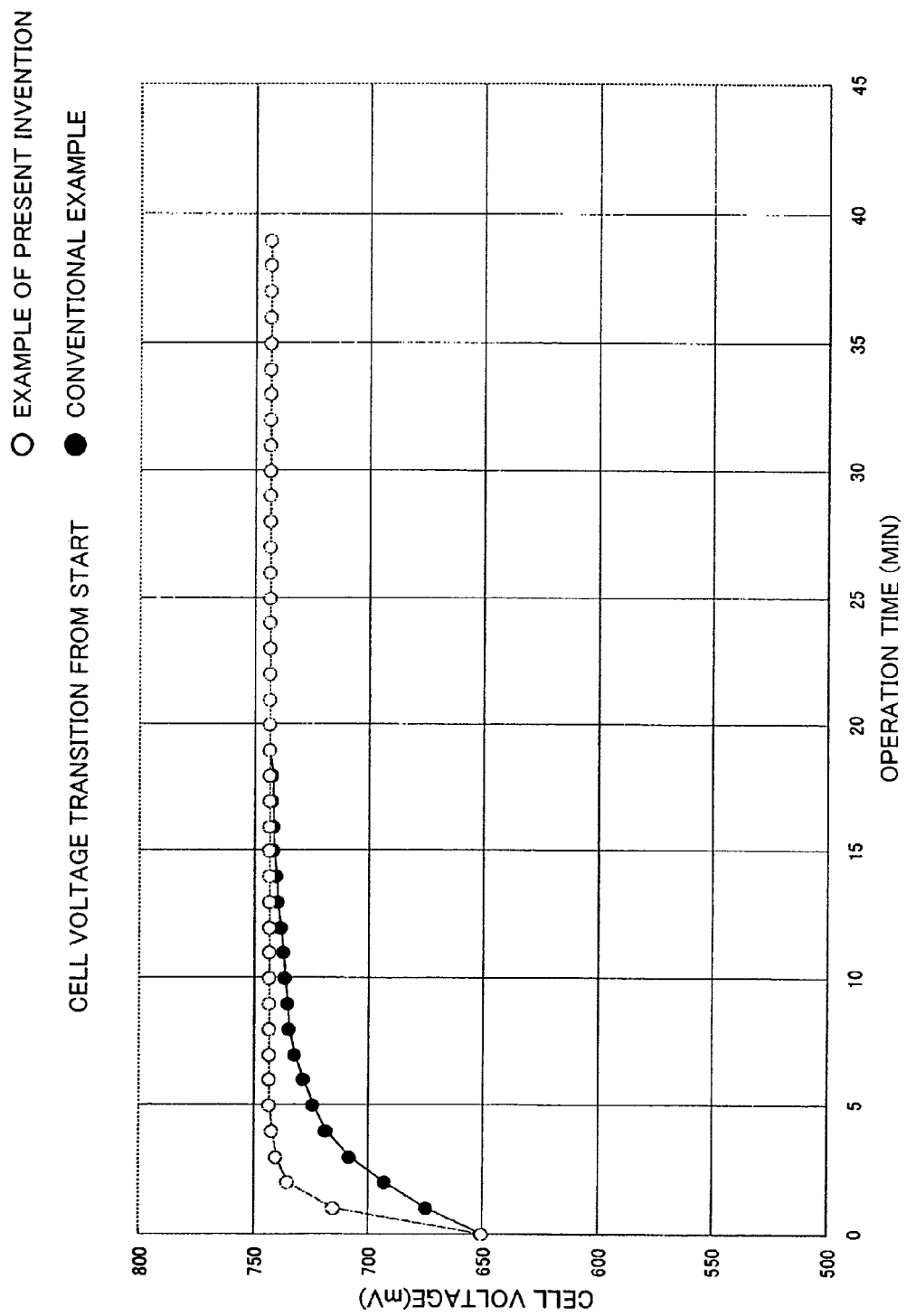
FIG. 12 is a graph showing a comparison of the start characteristics of cell voltage between the polymer electrolyte fuel cell according to Example 2 and a conventional fuel cell.

FIG. 12 shows a re-start characteristic of Example 2. As shown in FIG. 12, in the four-cell stack in the conventional example, the time required from start to rated operation in re-start was substantially equal to the time in first start, whereas, as apparent from FIG. 12, in the four-cell stack of Example 2, the time required from start to rated operation in re-start was reduced in contrast to the conventional example. Typically, the polymer electrolyte fuel cell does not gain desired cell characteristics until the polymer electrolyte membrane contains sufficient water in its operation principle, and requires roughly several to several tens of minutes from the start to the rated operation. However, in Example 2 of the second embodiment, since the gap 109 between the gasket 6 and the gas diffusion electrode 7 is formed in a wave shape, the gap 109 connecting the fuel gas supply manifold hole 3A and the fuel gas discharge manifold hole 3B and the gap 109 connecting the oxidizing gas supply gas manifold hole 5A and the oxidizing gas discharge manifold hole 5B are longer than a non-wavy gap, and most of the water contained in the fuel gas remains in these gaps 109. It is presumed that in Example 2, the time required from the start to the rated operation in restart of the polymer electrolyte fuel cell became shorter than the time required in the first start, because the polymer electrolyte membrane contains water stored in the gaps 109.

ALTERNATIVE EXAMPLES 2

Figure 10B:
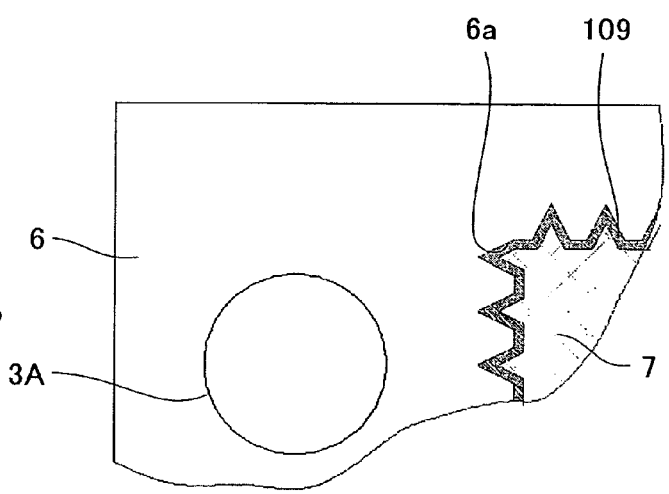
FIG. 10B is an enlarged plan view showing an alternative structure of the portion corresponding to the X portion in FIG. 9.
Figure 10C:
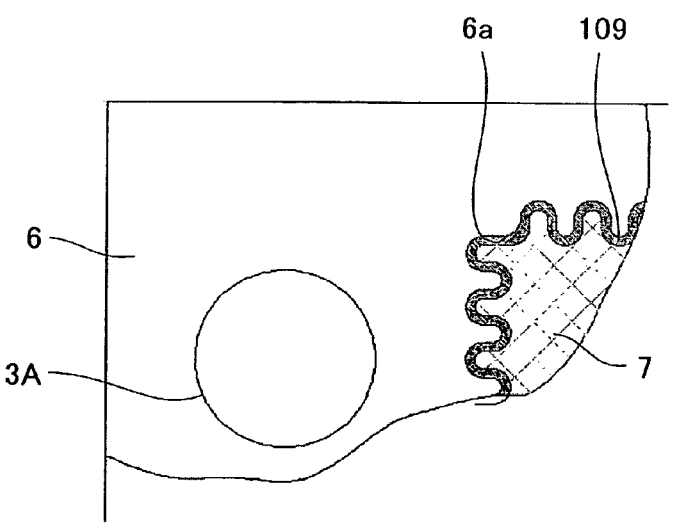
FIG. 10C is an enlarged plan view showing another alternative structure of the portion corresponding to the X portion in FIG. 9.

FIGS. 10B and 10C are enlarged plan views showing the structure of the X portion in FIG. 9 according to alternative examples 2 of the second embodiment. As shown in FIG. 10B, the gap 109 is formed in the shape of continuous triangular waves (6 mm pitch×50 turn). As shown in FIG. 10C, the gap 109 is formed in the shape of continuous circular arcs (6 mm pitch×50 turn). As should be appreciated, since the gaps 109 formed in the shape of a triangular wave or shapes other than straight line segments become long because of the presence of the bent portions, and most of the water contained in the fuel gas remains in the bent portions, similar effects are obtained.

EMBODIMENT 3

Figure 13:
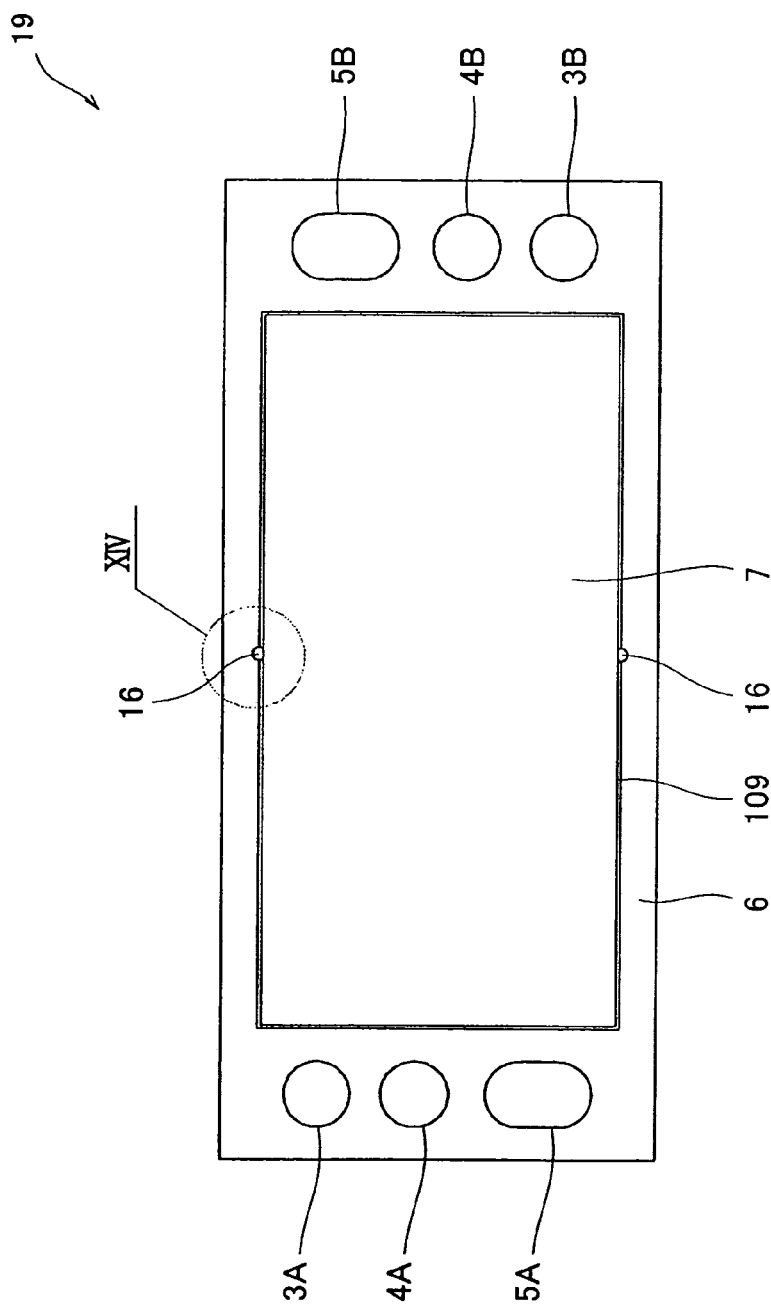
FIG. 13 is a plan view showing the structure of an MEA-gasket assembly equipped in a polymer electrolyte fuel cell according to a third embodiment of the present invention.
Figure 14:
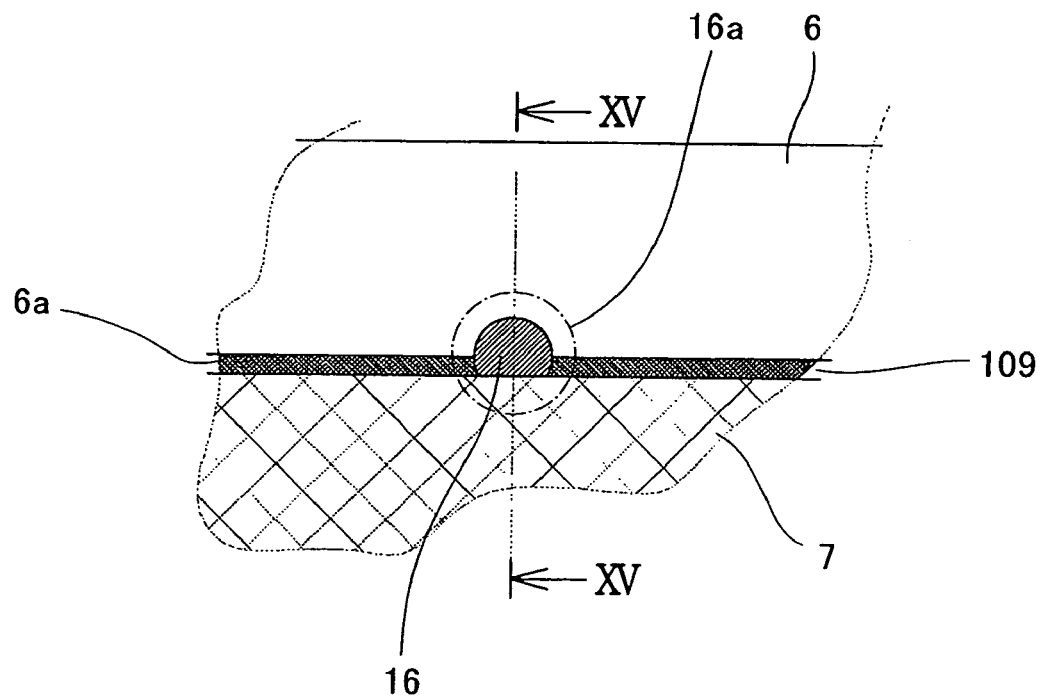
FIG. 14 is an enlarged plan view showing the structure of the portion represented by XIV in FIG. 13.
Figure 15:
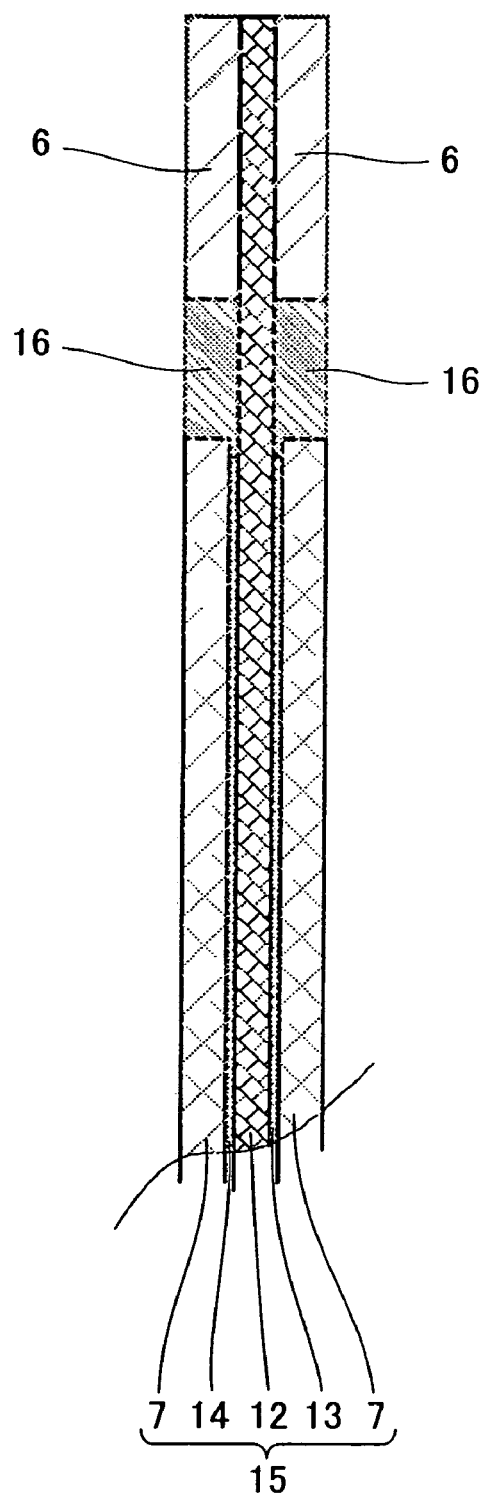
FIG. 15 is a cross-sectional view taken along line XV-XV in FIG. 14.

FIG. 13 is a plan view showing the structure of an MEA-gasket assembly 19 of a polymer electrolyte fuel cell according to a third embodiment of the present invention. FIG. 14 is an enlarged plan view showing the structure of the portion represented by XIV in FIG. 13. FIG. 15 is a cross-sectional view taken along line XV-XV in FIG. 14. In FIGS. 13 through 15, the same reference numerals as those in FIGS. 5 and 6 denote the same or corresponding parts.

Referring to FIGS. 13 through 15, the MEA-gasket assembly 19 of the third embodiment is substantially identical to that of the MEA-gasket assembly 19 of the first embodiment, except for the structure of the gap 109 between the gasket 6 and the gas diffusion electrode 7. Hereinafter, a detailed description of the MEA-gasket assembly 19 is omitted, and differences between the first and third embodiments will be described.

Referring to FIG. 14, in the third embodiment, a plastic body 16 is provided in part of the gap 109 between the gasket 6 and the gas diffusion electrode 7 on the principal surface of the MEA-gasket assembly 19 on the fuel gas side. The gasket 6 is provided with a semicircular cut portion according to the size of the plastic body 16 on the inner periphery 6a at a position where the plastic body 16 is provided. The semicircular cut portion is hereinafter referred to as an enlarged width portion 16a of the gap 109. In addition, in the same manner, a plastic body 16 is provided in part of the gap 109, and an enlarged width portion 16a of the gap 109 is formed in the gasket 6 on the opposite surface of the MEA-gasket assembly 19, i.e., the principal surface of the assembly 19 (not shown) on the oxidizing gas side.

As shown in FIGS. 14 and 15, the MEA-gasket assembly 19 is manufactured by joining the polymer electrolyte membrane 12, the catalyst layers 13 and 14 provided on surfaces of both sides of the center portion of the polymer electrolyte membrane 12, the gas diffusion electrodes 7 disposed on the outer surfaces of the catalyst layers 13 and 14 so as to have the outer periphery of the gas diffusion electrodes 7 located inwardly relative to the outer periphery of the polymer electrolyte membrane 12, the gaskets 6 provided on the peripheral portions of surfaces of both sides of the MEA 15 with the gaps 109, and plastic bodies 16 (closure) disposed in the enlarged width portions 16a (not shown in FIG. 15) of the gaskets 6. The plastic bodies 16 are plastic-deformed to fill the enlarged width portions 16a of the gaps 109. In the third embodiment, the plastic bodies 16 are made of thermoplastic resin, and the MEA 15 and the gaskets 6 are subjected to a thermo-compression bonding process. The plastic bodies 16 are dissolved by the thermo-compression bonding process and thereafter solidified to close the enlarged width portions 16a of the gaps 109 between the gaskets 6 and the gas diffusion electrodes 7.

In the polymer electrolyte fuel cell so constructed, since the plastic bodies 16 are disposed in the gap 109 on the principal surface of the MEA-gasket assembly 19 on the fuel gas side, it is possible to inhibit the fuel gas from flowing from the fuel gas supply manifold 3A' to the fuel gas discharge manifold 3B' through the gap 109. Likewise, since the plastic bodies 16 are disposed in the gap 109 on the principal surface of the MEA-gasket assembly 19 on the oxidizing gas side, it is possible to inhibit the oxidizing gas from flowing from the oxidizing gas supply manifold 5A' to the oxidizing gas discharge manifold 5B' through the gap 109.

EXAMPLE 3

In this Example 3 according to Embodiment 3, the MEA-gasket assembly 19 shown in FIGS. 13 through 15 was manufactured by the following process.

First, the catalyst layers 13 and 14 were transferred to the polymer electrolyte membrane 12 by the method of Example 1. Then, EPDM was coated to a thickness of 100 μm on both surfaces of a 100 μm thick PET sheet, and an electron beam cross-linking was carried out, thereby manufacturing a sheet gasket 300 μm thick. Thereafter, the sheet gasket was molded by a Thomson cutting mold to form the gasket 6 having a shape shown in FIG. 13. Specifically, the gasket 6 is sized to be 130×300 mm, and has an inner periphery 6a of 108×220 mm provided with semicircular cut portions, and the above-described pairs of manifold holes 3A, 3B, 4A, 4B, 5A, and 5B.

The plastic body 16 was formed by a polyethylene chip obtained by slicing polyethylene round bar with a diameter of 3 mm to a thickness of 400 μm.

As shown in FIGS. 14 and 15, the polymer electrolyte membrane 12, the catalyst layers 13 and 14 disposed on the center portions of both surfaces of the polymer electrolyte membrane 12, the gas diffusion electrodes 7 (107 mm×219 mm, CARBEL® CL 300 produced by Japan Goretex Co. Ltd) disposed on the outer surfaces of the catalyst layers 13 and 14 and located with their outer peripheries inwardly relative to the outer periphery of the polymer electrolyte membrane 12, the gaskets 6 provided with the gaps 109 between the gaskets 6 and the gas diffusion electrodes 7, and polyethylene chips 16 disposed in the enlarged width portions 16a of the gaps 109, were subjected to a thermo-compression bonding process at 130° C. and at 2 MPa for one minute, thereby forming the MEA-gasket assembly 19. At this time, the polyethylene chips 16 were dissolved and thereafter solidified to close the enlarged width portions 16a of the gaps 109 between the gaskets 6 and the gas diffusion electrodes 7. As in Example 1, the MEA-gasket assembly 19 was assembled into a four-cell stack. A characteristic test was carried out as in Example 1. A desirable result was obtained.

EMBODIMENT 4

Figure 16:
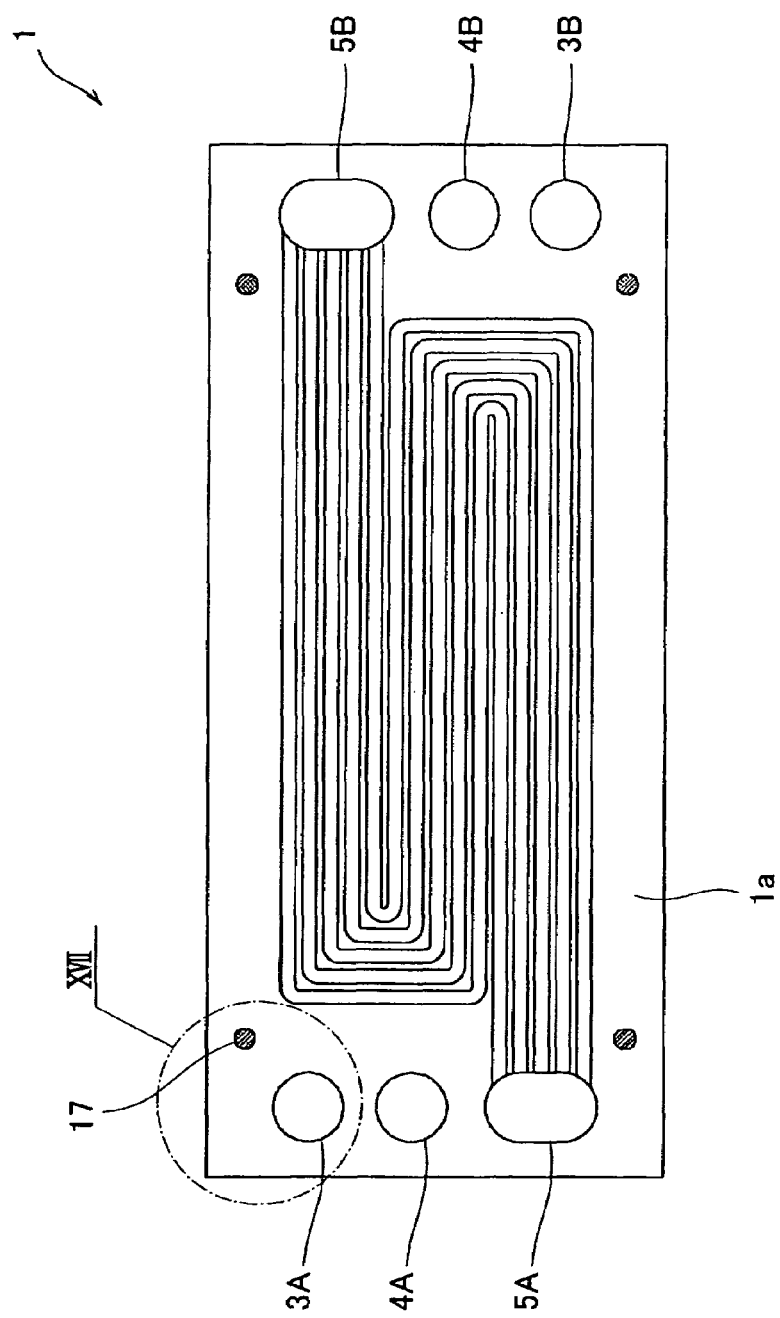
FIG. 16 is a plan view showing the structure of an inner surface of a cathode separator equipped in a polymer electrolyte fuel cell according to a fourth embodiment of the present invention.
Figure 17B:
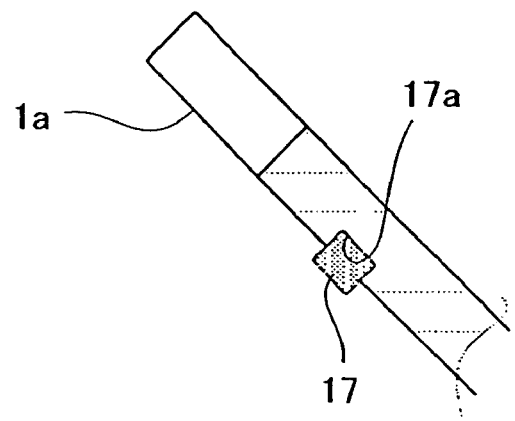
FIG. 17B is a cross-sectional view taken along line XVIIb-XVIIb in FIG. 17A.
Figure 17A:
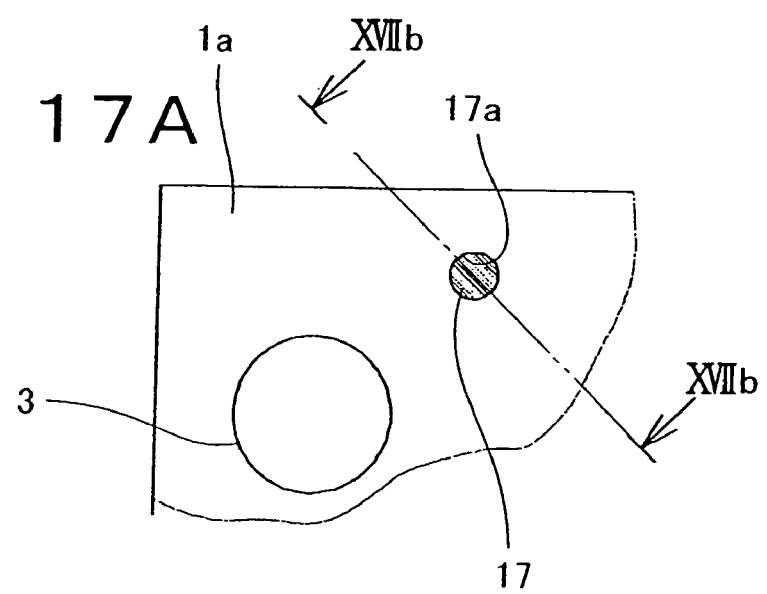
FIG. 17A is an enlarged plan view showing the structure of the portion represented by XVII in FIG. 16.
Figure 18:
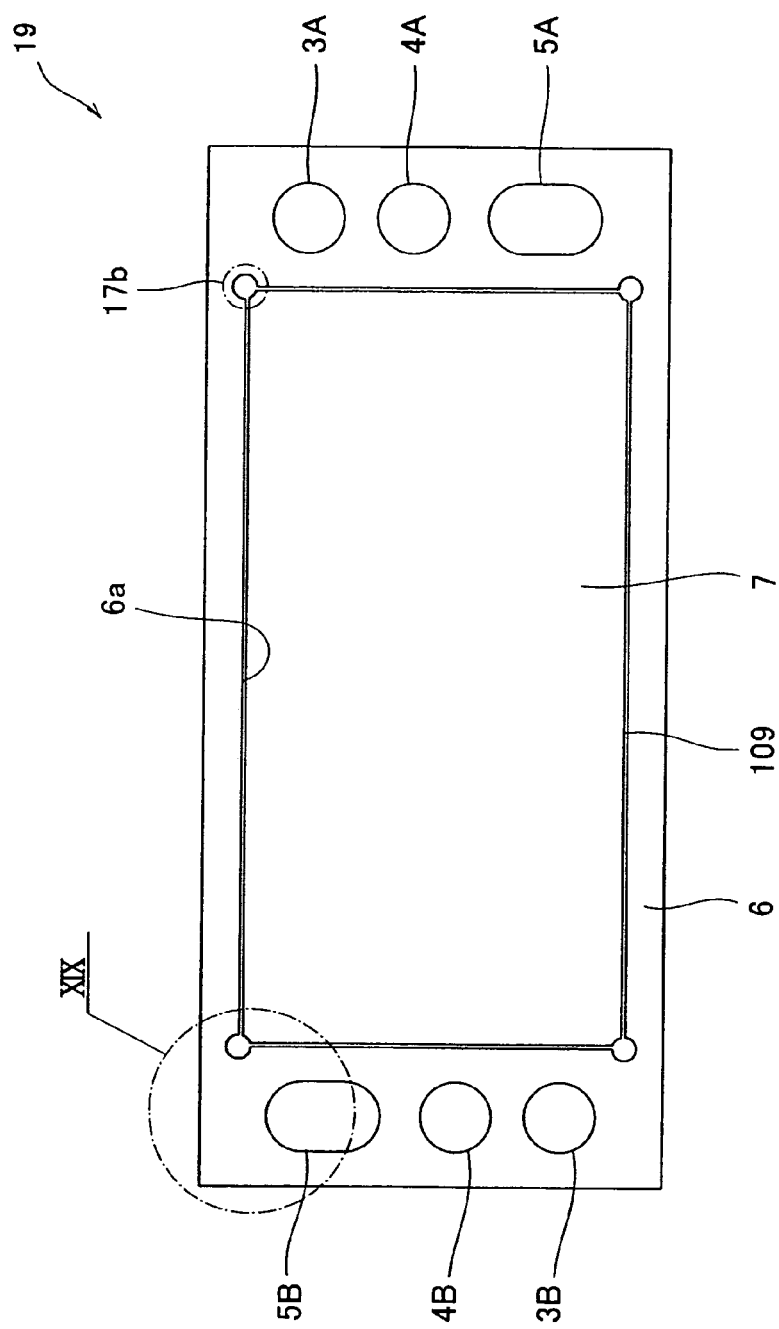
FIG. 18 is a plan view showing an MEA-gasket assembly equipped in a polymer electrolyte fuel cell according to the fourth embodiment.
Figure 19:
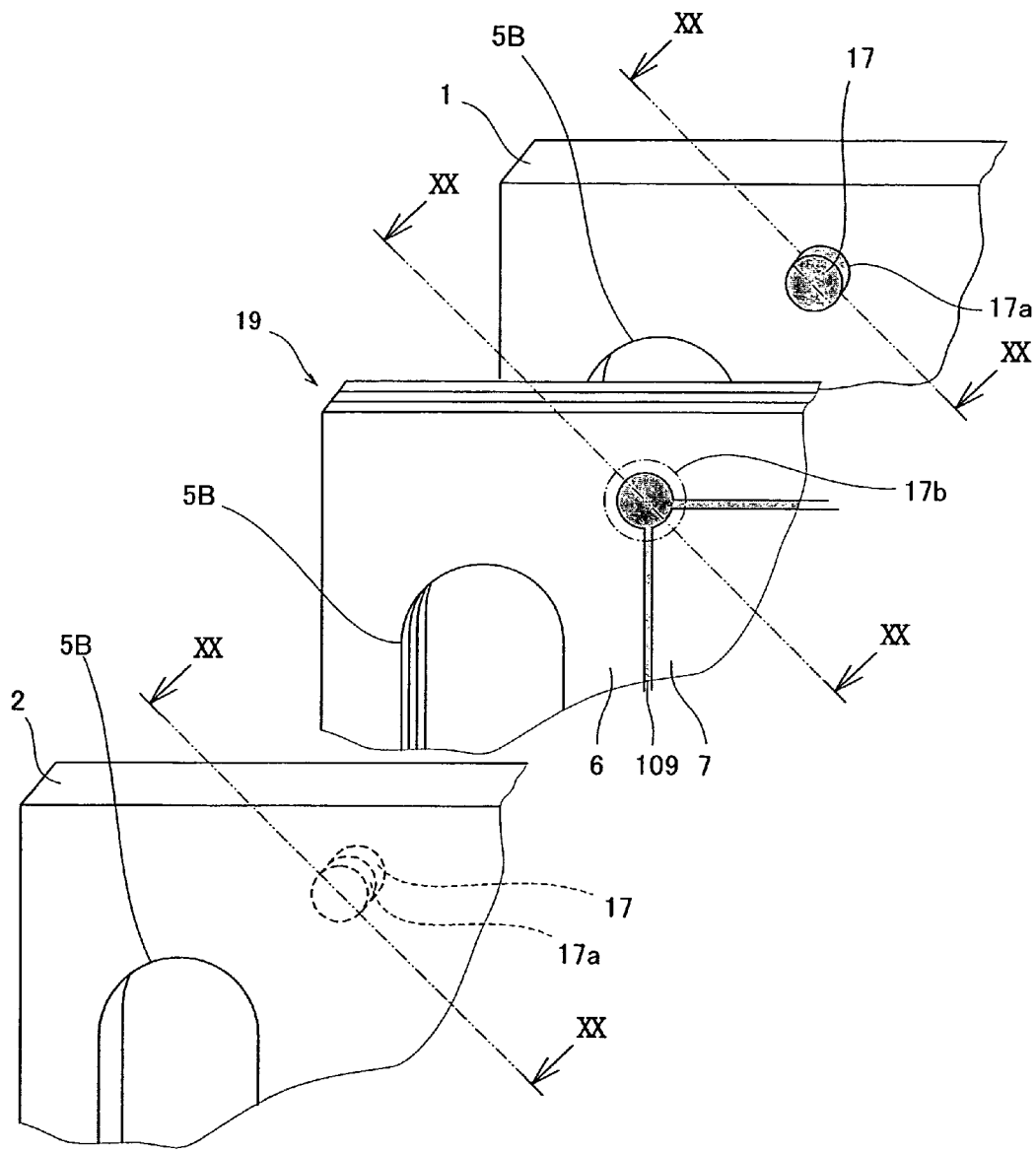
FIG. 19 is an enlarged and exploded perspective view showing the MEA gasket assembly of the XIX portion in FIG. 18, and a cathode separator and an anode separator which contact the XIX portion.
Figure 20:
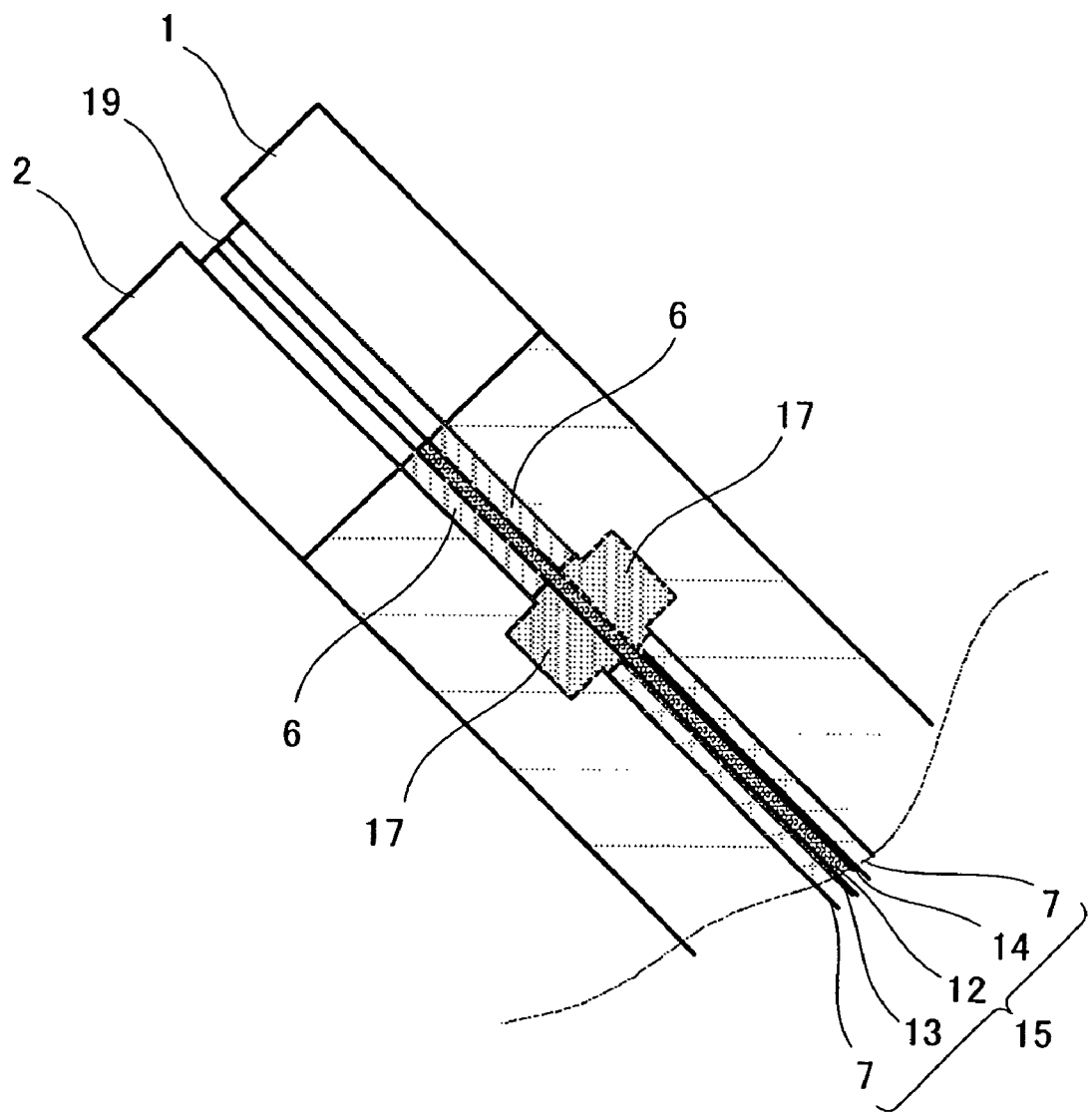
FIG. 20 is a cross-sectional view taken along lines XX-XX in FIG. 19.
Figure 21:
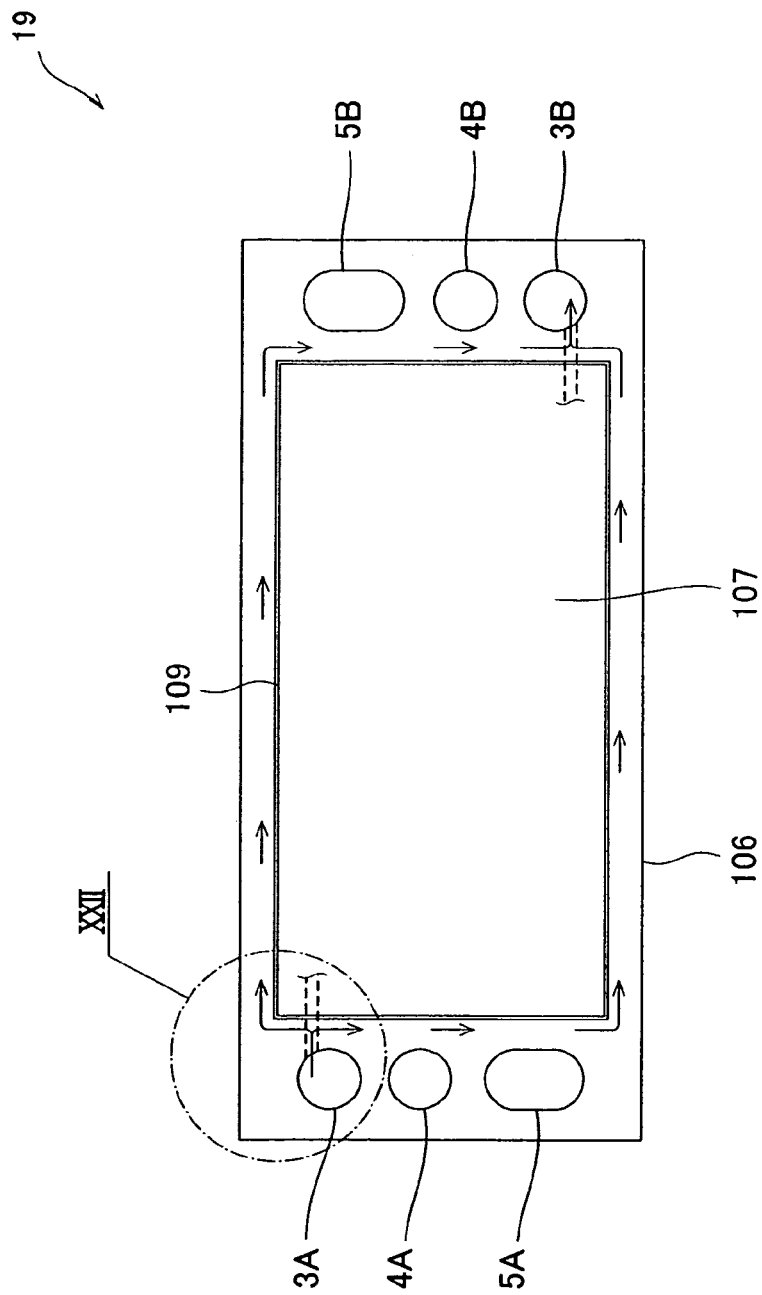
FIG. 21 is a plan view showing the structure of a conventional MEA-gasket assembly.
Figure 22:
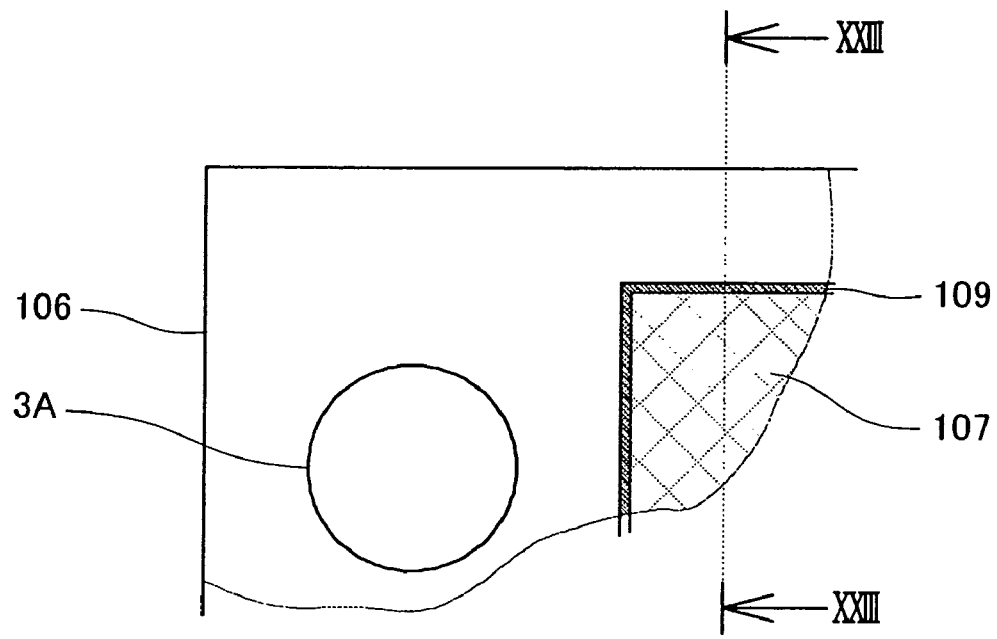
FIG. 22 is an enlarged plan view showing the structure of the portion represented by XXII in FIG. 21.

FIG. 16 is a plan view showing the structure of the inner surface 1a of the cathode separator 1 of a polymer electrolyte fuel cell according to a fourth embodiment of the present invention. FIG. 17A is an enlarged plan view showing the structure of the portion represented by XVII in FIG. 16, and FIG. 17B is an enlarged cross-sectional view showing the structure of the XVII portion. FIG. 18 is a plan view showing the structure of an MEA-gasket assembly 19 of the polymer electrolyte fuel cell according to the fourth embodiment. FIG. 19 is an enlarged exploded perspective view showing a stack structure of the XIX portion in FIG. 18, and the cathode separator 1 and the anode separator 2 which contact the XIX portion. FIG. 20 is a cross-sectional view taken along lines XX-XX in FIG. 19 with the cell layers back together. In FIGS. 16 through 20, the same reference numerals as those in FIGS. 5 and 6 denote the same or corresponding parts which will not be further described.

As shown in FIGS. 16 through 19, the cathode separator 1 and the MEA-gasket assembly 19 of the fourth embodiment are substantially identical to those described in the first embodiment, except for structures of the inner surface 1a of the cathode separator 1 and the gap 109 between the gasket 6 and the gas diffusion electrode 7. In the fourth embodiment, therefore, a detailed description of the cathode separator 1 and the MEA-gasket assembly 19 is omitted, and the differences between the first embodiment and the fourth embodiment will be described. The inner surface 2a of the anode separator 2 is substantially identical to that of the inner surface 1a of the cathode separator 1, and therefore is not shown.

Referring to FIGS. 16 and 17, in the fourth embodiment, elastic bodies 17 (closure) are provided on the inner surface 1a of the cathode separator 1. The elastic bodies 17 are, for example, cylindrical. Elastic body receiving holes 17a are provided on the inner surface 1a of the cathode separator 1 at positions corresponding to four corner portions of the rectangular and annular gap 109 between the gasket 6 and the gas diffusion electrode 7 of the MEA-gasket assembly 19. As shown in FIG. 17, the elastic bodies 17 are fitted in the elastic body receiving holes 17a.

As shown in FIG. 18, circular enlarged width portions 17b are formed in part of the gap 109 on the principal surface of the MEA-gasket assembly 19 on the oxidizing gas side, which contacts the inner surface 1a of the cathode separator 1 in FIG. 16. The enlarged width portions 17b are formed by rounding the four corner portions of the gap 109, i.e., the four corners of the inner periphery 6a of the gasket 6 and the four corners of the gas diffusion electrodes 7. The enlarged width portions 17b are formed such that cut portions of the four corner portions of the inner periphery 6a of the gasket 6 and cut portions of the four corner portions of the gas diffusion electrode 7 are shaped in a substantially circular shape.

Although not shown, elastic body receiving holes 17a are provided on the inner surface 2a of the anode separator 2 and elastic bodies 17 are fitted in these holes 17a in the same manner. In addition, in the same manner, enlarged width portions 17b are formed on the principal surface of the MEA-gasket assembly 19 on the fuel gas side, i.e., the principal surface which contacts the inner surface 2a of the anode separator 2.

As shown in FIG. 19, the cathode separator 1, the MEA-gasket assembly 19, and the anode separator 2 are stacked in fastening the cells 18. After the cells 18 are fastened, the elastic bodies 17 fit into the enlarged portions 17b to close the gap 109, as shown in FIGS. 19 and 20.

In the polymer electrolyte fuel cell constructed as described above, the elastic bodies 17 are provided at the four corners of the gap 109 between the gasket 6 and the gas diffusion electrode 7. It is thereby possible to inhibit the fuel gas from flowing from the fuel gas supply manifold 3A' to the fuel gas discharge manifold 3B' through the gap 109 on the principal surface of the MEA-gasket assembly 19 on the fuel gas side. Likewise, it is possible to inhibit the oxidizing gas from flowing from the oxidizing gas supply manifold 5A' to the oxidizing gas discharge manifold 5B' through the gap 109 on the principal surface of the MEA-gasket assembly 19 on the oxidizing gas side.

EXAMPLE 4

In this Example 4 according to Embodiment 4, the cathode separator 1 shown in FIGS. 16 and 17 and the MEA-gasket assembly 19 shown in FIGS. 19 and 20 were manufactured. The anode separator 2 is identical to the cathode separator 1, and is not shown in the drawing. As shown in FIGS. 16 and 17, the elastic body receiving holes 17a were formed on the inner surface 1a of the cathode separator 1 at positions corresponding to the four corners of the gap 109 to allow the elastic bodies 17 to fit in the holes 17a. Likewise, elastic body receiving holes 17a were formed on the inner surface 2a of the anode separator 2. The elastic bodies 17 were manufactured from rubber boss material (VITON® produced by Dupont and having a hardness of Hs55).

As shown in FIG. 18, the enlarged width portions 17b of the gap 109 were formed on the MEA-gasket assembly 19 in such a manner that the four corners of the inner periphery 6a of the gasket 6 and the four corners of the gas diffusion electrode 7 were cut into a round shape. The cathode separator 1, the anode separator 2, and the MEA-gasket assembly 19 were assembled into a cell stack by the method of Example 1.

In Example 4 the characteristic test was carried out as in Example 1, and a desirable result was obtained. In addition, the rubber bosses 17 fitted in the inner surface 1a of the cathode separator 1 and the inner surface 2a of the anode separator 2 facilitate positioning the MEA-gasket assembly 19, the cathode separator 1, and the anode separator 2. As a result, stack assembling was facilitated and desirable assembly was achieved.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

We claim:

1. A polymer electrolyte fuel cell comprising:
   an MEA-gasket assembly including an MEA (membrane electrode assembly) having a polymer electrolyte membrane, a pair of catalyst layers that sandwich the polymer electrolyte membrane between the catalyst layers, and a pair of gas diffusion electrodes provided on outer surfaces of the pair of catalyst layers, an outer periphery of the gas diffusion electrodes being located inwardly relative to an outer periphery of the polymer electrolyte membrane, and a pair of gaskets provided on peripheral portions of principal surfaces on both sides of the MEA with gaps between respectively adjacent gaskets and gas diffusion electrodes; and
   a pair of electrically conductive separators disposed to sandwich the MEA-gasket assembly, the separators having groove-shaped cell reaction gas passages on inner surfaces thereof, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket, wherein
   each of the gaps is at least partially closed by a closure and wherein the closure is configured to cause an inner periphery of the respective gasket to partially contact an outer periphery of the respective gas diffusion electrode
   wherein the closure is configured to cause the inner periphery of the respective gasket to partially contact the outer periphery of the respective gas diffusion electrode in such a manner that the inner periphery of the respective gasket is partially overlapped with the outer periphery of the respective gas diffusion electrode, and the electrically conductive separators contact respective outer surfaces of the MEA-gasket assembly in such a manner that the respective overlapped portion of the gas diffusion electrode is crushed.

2. A polymer electrolyte fuel cell comprising:
   an MEA-gasket assembly including an MEA (membrane electrode assembly) having a polymer electrolyte membrane, a pair of catalyst layers that sandwich the polymer electrolyte membrane between the catalyst layers, and a pair of gas diffusion electrodes provided on outer surfaces of the pair of catalyst layers, an outer periphery of the gas diffusion electrodes being located inwardly relative to an outer periphery of the polymer electrolyte membrane, and a pair of gaskets provided on peripheral portions of principal surfaces on both sides of the MEA with gaps between respectively adjacent gaskets and gas diffusion electrodes; and
   a pair of electrically conductive separators disposed to sandwich the MEA-gasket assembly, the separators having groove-shaped cell reaction gas passages on inner surfaces thereof, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket, wherein
   each of the gaps is at least partially closed by a closure with at least one plastic-deformed plastic body comprising a thermoplastic resin and wherein the gap is closed in such a manner that the at least one plastic body is disposed in at least one enlarged width portion formed in the gap and the at least one plastic body is plastic-deformed to fill the at least one enlarged width portion of the gap.

3. A polymer electrolyte fuel cell comprising:
   an MEA-gasket assembly including an MEA (membrane electrode assembly) having a polymer electrolyte membrane, a pair of catalyst layers that sandwich the polymer electrolyte membrane between the catalyst layers, and a pair of gas diffusion electrodes provided on outer surfaces of the pair of catalyst layers, an outer periphery of the gas diffusion electrodes being located inwardly relative to an outer periphery of the polymer electrolyte membrane, and a pair of gaskets provided on peripheral portions of principal surfaces on both sides of the MEA with gaps between respectively adjacent gaskets and gas diffusion electrodes; and
   a pair of electrically conductive separators disposed to sandwich the MEA-gasket assembly, the separators having groove-shaped cell reaction gas passages on inner surfaces thereof, each of the cell reaction gas passages running sequentially across a first portion of a respective gasket of the pair of gaskets, a first portion of a respective gap of the gaps, a respective gas diffusion electrode of the pair of gas diffusion electrodes, a second portion of the respective gap, and a second portion of the respective gasket, wherein
   each of the gaps is at least partially closed by a closure with at least one elastically deformed elastic body and wherein the gap is closed in such a manner that the at least one elastic body fits in at least one elastic body receiving hole provided at a position of an inner surface of the respective electrically conductive separator corresponding to an enlarged width portion formed on the gap, and the inner surface of the respective electrically conductive separator is brought into contact with an outer surface of the MEA-gasket assembly such that the at least one elastic body fits in the at least one enlarged width portion of the gap.

* * * * *

UNITED STATES PATENT AND TRADEMARK OFFICE
CERTIFICATE OF CORRECTION

PATENT NO. : 7,572,539 B2  Page 1 of 1
APPLICATION NO. : 10/920546
DATED : August 11, 2009
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Seventh Day of September, 2010

David J. Kappos
*Director of the United States Patent and Trademark Office*